United States Patent
Birdwell et al.

(10) Patent No.: US 10,054,290 B2
(45) Date of Patent: Aug. 21, 2018

(54) MOVABLE BARRIER OPERATOR LIGHT DISTRIBUTION

(71) Applicant: The Chamberlain Group, Inc., Elmhurst, IL (US)

(72) Inventors: Timothy Gale Birdwell, Lafayette, TN (US); Eric Colin Bretschneider, Bowling Green, KY (US); James J. Fitzgibbon, Batavia, IL (US)

(73) Assignee: The Chamberlain Group, Inc., Oak Brook, IL (US)

( * ) Notice: Subject to any disclaimer, the term of this patent is extended or adjusted under 35 U.S.C. 154(b) by 287 days.

(21) Appl. No.: 14/879,678

(22) Filed: Oct. 9, 2015

(65) Prior Publication Data

US 2016/0033718 A1 Feb. 4, 2016

Related U.S. Application Data

(63) Continuation-in-part of application No. 14/521,824, filed on Oct. 23, 2014, now abandoned.

(60) Provisional application No. 62/067,610, filed on Oct. 23, 2014, provisional application No. 61/894,684, filed on Oct. 23, 2013.

(51) Int. Cl.

| | |
|---|---|
| *F21V 7/04* | (2006.01) |
| *F21V 8/00* | (2006.01) |
| *E05F 15/668* | (2015.01) |
| *F21K 9/61* | (2016.01) |
| *F21V 33/00* | (2006.01) |
| *F21V 3/02* | (2006.01) |
| *E05F 15/684* | (2015.01) |
| *F21Y 115/10* | (2016.01) |

(52) U.S. Cl.
CPC ............ *F21V 7/041* (2013.01); *E05F 15/668* (2015.01); *F21K 9/61* (2016.08); *G02B 6/0008* (2013.01); *E05F 15/684* (2015.01); *E05Y 2201/10* (2013.01); *E05Y 2800/106* (2013.01); *F21V 3/02* (2013.01); *F21V 33/006* (2013.01); *F21Y 2115/10* (2016.08)

(58) Field of Classification Search
CPC ...... E05F 15/668; F21V 7/041; F21V 33/006; F21K 9/61
See application file for complete search history.

(56) References Cited

U.S. PATENT DOCUMENTS 6,177,761 B1 1/2001 Pelka
6,488,392 B1 12/2002 Lu
(Continued)

FOREIGN PATENT DOCUMENTS

DE 202008017116 U1 3/2009

*Primary Examiner* — Karabi Guharay
(74) *Attorney, Agent, or Firm* — Fitch Even Tabin & Flannery LLP

(57) ABSTRACT

A movable barrier operator mounts to a ceiling or a wall of a garage. The movable barrier operator includes an operator housing with a motor configured to open and close a movable barrier. The movable barrier operator also includes an LED light source mounted to the housing, a light cover, and a light distributing element. The light cover has several side surfaces that surround or covers the light source. The light distributing element mounts relative to the light source and is configured to scatter light projected by the LED light source so that some of the scattered light is directed toward one or more of the side surfaces of the light cover.

27 Claims, 13 Drawing Sheets

(56) References Cited

U.S. PATENT DOCUMENTS

| | | |
|---|---|---|
| 6,607,286 B2 | 8/2003 | West |
| 6,796,698 B2 * | 9/2004 | Sommers ................ F21V 7/041 340/815.45 |
| 6,924,942 B2 | 8/2005 | Curtis |
| 6,997,850 B2 | 2/2006 | Giefer |
| 7,425,084 B2 | 9/2008 | Ruud |
| 7,618,163 B2 | 11/2009 | Wilcox |
| 7,766,509 B1 | 8/2010 | Laporte |
| 8,292,471 B2 | 10/2012 | Boonekamp |
| D689,634 S | 9/2013 | Tsai |
| 8,545,050 B2 | 10/2013 | Lee |
| 8,851,731 B2 * | 10/2014 | Zhang ....................... F21V 9/16 362/311.02 |
| 9,354,377 B2 | 5/2016 | York |
| 2010/0157571 A1 | 6/2010 | Lai |
| 2012/0236590 A1 | 9/2012 | Parker |
| 2014/0043845 A1 | 2/2014 | Chen |

\* cited by examiner

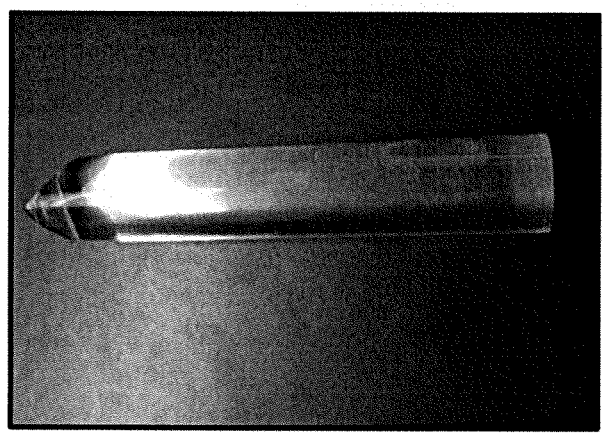
FIG. 18A
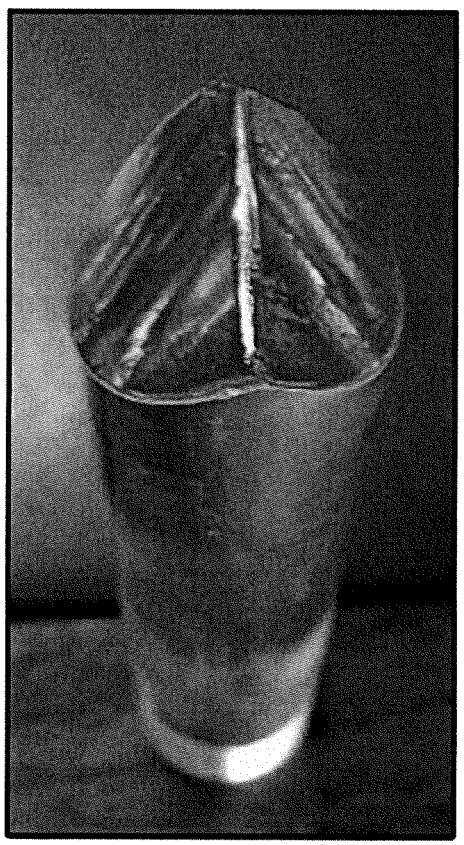 
FIG. 18B    FIG. 18C

MOVABLE BARRIER OPERATOR LIGHT DISTRIBUTION

RELATED APPLICATIONS

This application is a continuation in part of U.S. non-provisional application Ser. No. 14/521,824, titled "Light With Asymmetric Distribution Pattern" filed on Oct. 23, 2014, which claims the benefit of U.S. provisional application No. 61/894,684, titled "Decorative Light with Asymmetric Distribution Pattern," filed on Oct. 23, 2013, each of which is hereby incorporated by reference in their entireties; this application also claims the benefit of U.S. provisional application No. 62/067,610, filed Oct. 23, 2014, which is incorporated by reference in its entirety herein.

TECHNICAL FIELD

The present disclosure relates generally to systems and methods that distribute and/or project light. More specifically, the present disclosure relates to systems and methods that distribute and/or project light in asymmetrical lighting patterns.

BACKGROUND

Light emitting diode ("LED") light sources can be longer lasting and more energy efficient than incandescent light sources. As a result, LED's can be a suitable, and often desirable, replacement for incandescent light sources. LED light sources are generally Lambertian in nature. That is, LED light sources generally appear to have the same brightness from any viewing angle in the projection region. That is because, as the viewing angle of an observer changes with respect to the optic axis of the light source, the apparent size of the observed emission surface decreases by about the same fraction as the intensity of projected light. Because apparent brightness (or luminance) is a measure of power per of unit of projected source area, the apparent brightness appears to be the same to an observer in the projection region. The Lambertian nature of LED light sources means that they generally only emit light in a single direction (e.g., forward, away from the light emitting surface), or towards a single projection region. That is, outside of the projection region (e.g., rearward of the light emitting surface), the LED generally projects no light, or virtually no light, without the assistance a reflective device. Thus, attempts to provide additional directionality behind the LED typically results in unconventional looking bulbs.

In contrast, incandescent light sources are inherently non-directional. That is, incandescent light sources generally emit the same amount of light over a very wide range of angles. For example, incandescent light sources can emit light with essentially equal intensity in all directions (i.e., over 360°) in the horizontal plane of the light source. That is, the intensity of light projected from an incandescent light source is essentially the same in front of the light source, behind the light source, and on all sides of the light source. And even in a vertical plane, the intensity of light from an incandescent source can vary by less than 10% over an angular range of about 270°. Thus, incandescent bulbs located near a wall or ceiling emit a large fraction of their light onto the wall or ceiling, which results in high reflective losses. It would be thus be useful for a light source to provide the sustainability and efficiency of LED light sources having additional control over directionality of the emitted light.

SUMMARY

The present disclosure describes examples of a light guide that projects light in an asymmetric pattern. The light guide can be installable with respect to a light emitting diode ("LED") and extend along an optic axis. The light guide can be configured to project light with respect to a first parallel projection plane and a second parallel projection plane, where the first and second parallel projection planes are parallel to one another and to an optic axis, and are disposed on opposite sides of the optic axis. Additionally and/or alternatively, the light guide can be configured to project light with respect to a perpendicular projection plane. The perpendicular projection plane can be perpendicular to the optic axis and intersects the optic axis at a central lighting point.

In a typical application, the light guide installs with respect to an LED and extends along the optic axis. In some embodiments, the light guide includes an optic body that extends along the optic axis. The optic body has at least one side wall surrounding the optic axis. The light guide also has a proximal end with a proximal end surface configured to receive light from an emitting surface of the LED and a distal end situated away from the proximal end. The distal end has a distal end surface configured to distribute light emitted by the light emitting diode. In some examples, the light guide distributes light asymmetrically such that more light projects onto the first projection plane as compared to the second projection plane in at least one orientation of the first and second parallel projection planes around the optic axis. In other examples, the light guide distributes light about the perpendicular projection plane so that the light asymmetric with respect to at least one line in the projection plane that intersects the optic axis at a central lighting point. In some configurations, the light is asymmetric with respect to any line in the projection plane that intersects the optic axis at a central lighting point.

The present disclosure also describes embodiments of a light bulb assembly installable with respect to a LED. One example light bulb assembly guide projects light with respect to a first parallel projection plane and a second parallel projection plane (and/or to a perpendicular projection plane), the first and second parallel projection planes being parallel to and located on opposite sides of the optic axis. In some embodiments, the light bulb assembly includes a light guide and a globe enclosing the light guide. The light guide includes an optic body as discussed above.

Some aspects of the present disclosure describe a light fixture. The light fixture can be configured to project light with respect to a first parallel projection plane and a second parallel projection plane (and/or to a perpendicular projection plane), the first and second parallel projection planes being parallel to and located on opposite sides of an optic axis. An example of such a light fixture includes a heat sink having a LED with a light emitting surface. In some embodiments, the LED is connected to a remote power supply, such as a battery or 120 volt power supply. The light fixture can also include a light bulb assembly mountable to the heat sink. The light bulb assembly can include a light guide as discussed above and a globe enclosing the light guide. Such a light fixture can distribute light such that more light projects onto the first projection plane (such as away from a wall or ceiling) as compared to the second projection plane (such as the wall or ceiling).

The present disclosure also relates to methods of projecting light in an asymmetric pattern. Some methods involve using a light guide, a light bulb assembly, or a light fixture as described herein. The method can involve distributing light with respect to a first parallel projection plane and a second parallel projection plane (and/or to a perpendicular projection plane), the first and second parallel projection planes being parallel to and located on opposite sides of an optic axis. In some embodiments, a method can include emitting light from a LED. The method can also include distributing the light emitted from the LED with a light guide, light bulb assembly, light fixture, and/or another light source apparatus. The method can involve distributing light asymmetrically with respect to one or more projection planes. For example, the method can involve projecting more light onto the first projection plane as compared to the second projection plane in at least one orientation of the first and second parallel projection planes.

The present disclosure also presents embodiments of a movable barrier operator. In particular, some embodiments include movable barrier operators that employ examples of the light guides described herein. For example, a movable barrier operator (which may be mountable to a ceiling or a wall of a garage) includes an operator housing comprising a motor configured to open and close a movable barrier. A light source with an LED is mounted to the housing. The movable barrier operator includes a light cover attachable to the housing. The light cover has an interior and an exterior portion, a front surface opposite the housing, and side surfaces extending between the front surface and the housing, and is configured to cover the light source. The movable barrier operator also includes a light distributing element mountable to the light cover or the housing with respect to the light source. The light distributing element is configured to scatter light projected by the light source, and at least a portion of the scattered light is directed toward at least one of the four side surfaces of the light cover.

BRIEF DESCRIPTION OF THE DRAWINGS

FIGS. 18A-18C show a light distribution element for use in connection with a movable barrier operator in accordance having a two-sided roof top shape in accordance with at least one example of the present disclosure.

DETAILED DESCRIPTION

The present disclosure describes, light sources, light guides, light fixtures, and other components that project light in an asymmetric pattern. The present disclosure also describes movable barrier operators, such as garage door operators that incorporate such light sources, light guides, light fixtures, and other components. The present disclosure references the asymmetric lighting pattern with respect to various points, lines, axes, and projection planes. For example, the present disclosure refers to an optic axis. As used throughout this disclosure, the optic axis refers to a center line that generally follows the shape of the body of a light guide (the "optic body") and passes through both the proximal end and the distal end of the light guide. Upon passing through the distal end, the optic axis extends beyond the optic body and away from the distal end in a straight line. Consistent with this definition, FIGS. 1-4 and 6 show examples of an optic axis 20 as it relates to various configurations of a light guide and other lighting assemblies.

With respect to light distributed and/or projected by the light guide, this disclosure makes reference to points, lines, planes, or other geometries that contain, intersect with, are parallel to, and/or are perpendicular with the optic axis. Unless the context of the disclosure clearly suggests otherwise, such references generally refer generally to the portion of the optic axis that extends away from the distal end of the light guide.

Figure 1:
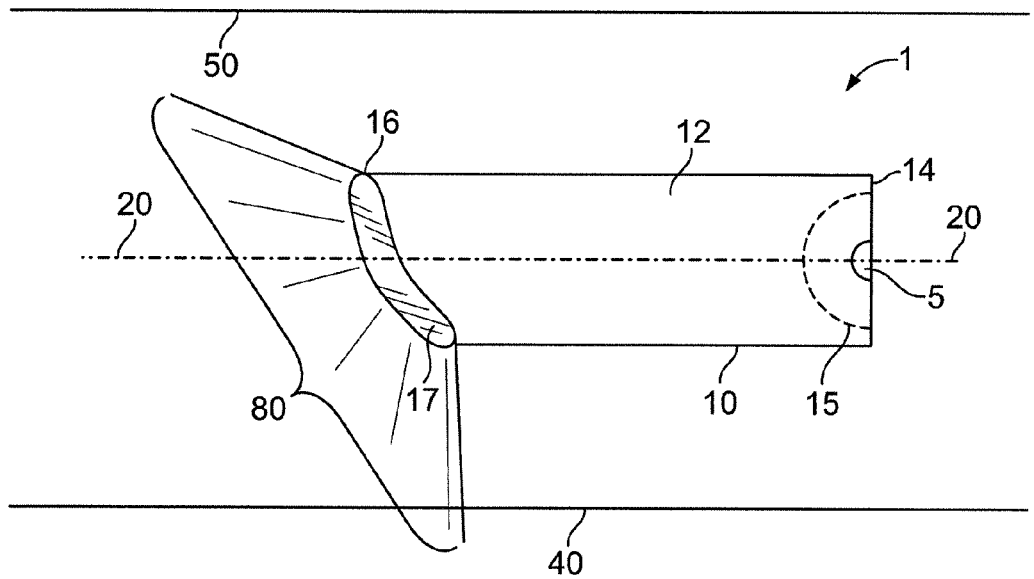
FIG. 1 shows a light guide with a curved distal end surface projecting light from an LED in accordance with at least one example of the present disclosure.
Figure 2:
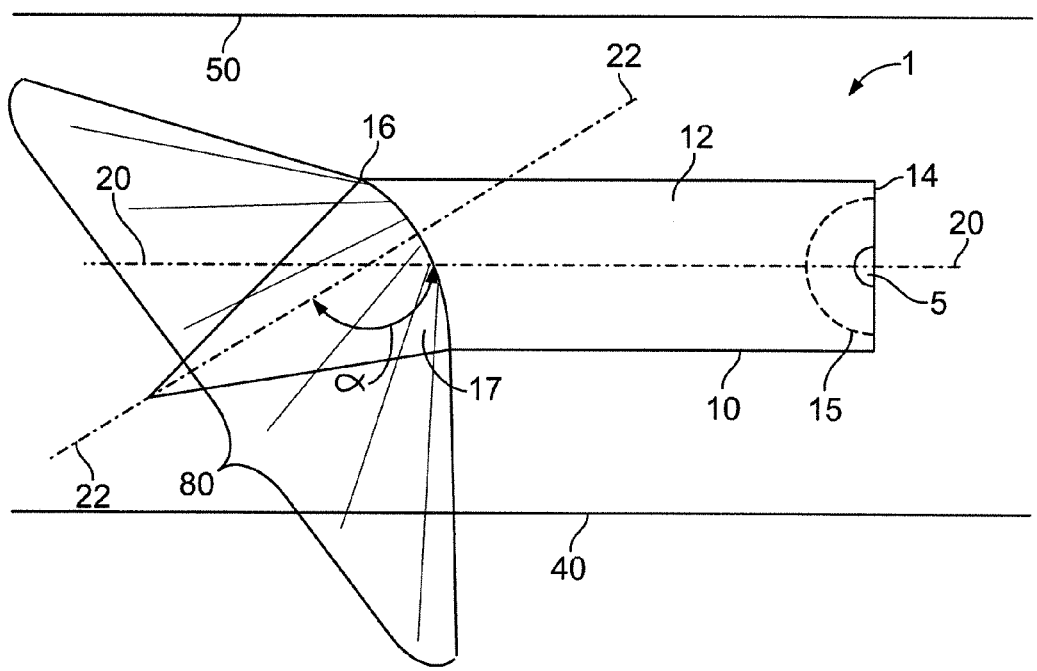
FIG. 2 shows a light guide with an offset conical-shaped distal end surface in accordance with at least one example of the present disclosure.

The present disclosure also references various planes, surfaces, or other 2-dimensional references relative to which the described light sources distribute and/or project light. For example, the present disclosure references parallel projection planes and a perpendicular projection plane with respect to a light source and/or a light guide. As used throughout this application parallel projection planes refer to planes that are parallel with the portion of the optic axis extending away from the distal end of the light guide. Parallel projection planes can be referenced in pairs, for example, a first parallel projection plane and a second parallel projection plane. In this manner, the pair of parallel projection planes are generally disposed parallel to each other and on opposing sides of the optic axis. FIGS. 1 and 2 show parallel projection planes (40 and 50) as they relate to various configurations of a light guide 1.

Figure 3:
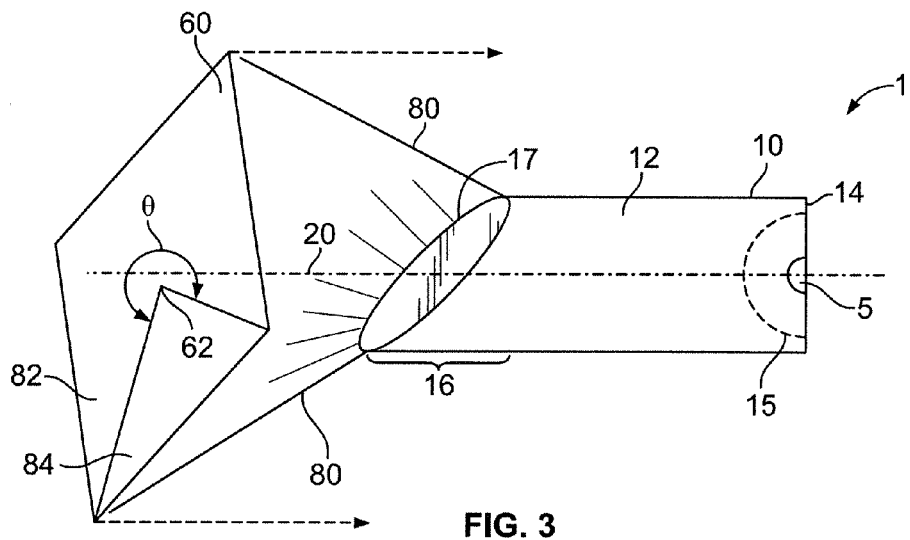
FIG. 3 shows a light guide projecting light onto a perpendicular projection plane in accordance with at least one example of the present disclosure.

As used throughout this disclosure, a perpendicular projection plane refers to a plane that intersects with, and is perpendicular to, the portion of the optic axis extending away from the distal end of the light guide. FIG. 3 shows a perpendicular projection plane 60 as it relates to one example of a light guide 1. Generally, the perpendicular projection plane 60 intersects with the optic axis 20 at a central lighting point 62. In some references, the perpendicular projection plane 60 can pass through, or contain the distal end of the light guide. In this manner, the perpendicular projection plane 60 is the plane at which a vertical standing light guide projects light in the horizontal plane extending about the distal end of the light guide.

Decorative light fixtures can be mounted on or near walls, ceilings, or corners of a room. Light fixtures can also be used outdoors, for example, in security light or carriage light fixtures. Using incandescent light sources in such decorative or other light fixtures can present issues, as a large fraction of the emitted light is directed to the adjacent wall and/or ceiling near the fixture. This light can then be reflected by the wall and/or ceiling, thereby resulting in high reflective losses that reduce the appearance of the light generated by the fixture. Further, light that is not absorbed by the wall or ceiling can result in the appearance of a high intensity halo forming around the fixture. These effects may distract from the decorative and aesthetic appearance of the fixture when it is turned on.

Unlike incandescent lights, LED light sources are inherently directional light sources. That is, LED light sources do not emit light in a backwards direction. Accordingly, light sources can use LED's to take advantage of directional nature and produce a different appearance than that offered by traditional incandescent lights. Alternatively, some light fixtures utilize non-transparent surfaces in close proximity to the light source to direct light to particular lighting areas. For example, light fixtures may employ opaque light shields or shades that absorb and/or reflect light in certain directions. However, this use of directional light shields and shades can also be insufficient, as these techniques may not allow any light to reflect off of mounting surfaces. It can be useful to have at least some light projecting on or towards a mounting surface so that there is at least some visibility, for example, so that an operator can see the mounting surface when the light source needs to be replaced or repaired. It therefore difficult to provide a light source that can project enough light towards a mounting surface to provide some visibility without projecting so much light that it causes the reflective and halo-forming issues described.

The present disclosure describes light guides that can be used to efficiently project light to or away from certain areas depending on the mounting location of a light source. For example, where light sources are mounted on or near a wall or ceiling of a room, the presently described light guides can be configured to project more light away from the ceiling or wall, so that the light is better distributed throughout the room, while also allowing a certain amount of light to project backward, towards the mounting surface. The light guides can also be used in outdoor light fixtures, so that light can be directed to particular areas (e.g., doorways) and away from other areas (e.g., walls), while retaining an outer appearance of a regular light bulb assembly (e.g., an Edison style incandescent light bulb).

Referring now to the figures, FIG. 1 shows one example of a light guide for projecting light in an asymmetric pattern. The light guide is configured to be mounted over a light source 5, which can be, for example, an LED or another Lambertian light source. The light source 5 can be mounted on a heat sink configured to be powered from a remote power source.

The light guide 1 includes an optic body 10 that has a side wall 12 surrounding the optic axis 20. The light guide 1 can be formed of glass or other polymeric material using known manufacturing methods. In this embodiment, the optic body 10 is generally of a cylindrical shape, thus the side wall 12 generally forms a circular shape that surrounds the optic axis. In other configurations, the optic body 10 can have another columnar shape, such that the cross section shape of the optic body 10 varies along the length of the optic body, but so that at least a portion of the optic axis is a straight line running generally perpendicular to the proximal end surface.

The illustrated light guide 1 also has a proximal end 14 that is positioned over the light source 5. The proximal end 14 has a proximal end surface 15 that is configured to cover or be placed over the light source 5 and/or receive light emitted by the light emitting surface of the light source 5. In some embodiments, the proximal end surface can be generally flat. In other embodiments, the proximal end surface 15 can be or can include an indentation, recess, or other concave feature configured to cover the emitting surface of an LED. In some examples, the proximal end 14 of the light guide 1 can be formed into an optical surface to facilitate the transmission of light between the light source 5 and the light guide.

The optic body 10 extends along the optic axis 20, which in FIG. 1, is shown to run generally straight and generally perpendicular to the light source 5. The distal end 16 of the light guide 1 has a distal end surface 17, which can have an asymmetric shape or pattern. In the example shown in FIG. 1, the distal end surface 17 is curved such that certain portions of the distal end 16 are farther from the proximal end 14 than other portions of the distal end 16.

FIG. 1 shows two parallel projection planes 40 and 50 that extend parallel to one another and to the optic axis 20. The parallel projection planes 40 and 50 are shown represented as lines, as the planes themselves extend into and out of the 2-dimensional surface of the figure on opposing sides of the optic axis 20.

The distal end surface 17 distributes projected light 80 from the light source 5 in a pattern that is asymmetric. For example, in the embodiment shown in FIG. 1, the shape and configuration of the light guide, and in particular, the shape and configuration of the distal end surface 17 projects light in an asymmetric pattern such that more light is projected onto the first parallel projection plane 40 than onto the second parallel projection plane 50 without use of reflectors, shades, or other elements other than the optic body 10 itself and any coatings applied thereto.

In some embodiments, the light projected onto each of the first 40 and/or second 50 projection planes itself is also asymmetric about lines along the first/second parallel projection planes. For example, in some aspects, the light distributed onto the first projection plane can be asymmetric about a line in the first projection plane that is parallel to the optic axis. That is, the light guide 1 can be configured to distribute more light above or below the optic axis on the first parallel projection plane 40. For example, a light guide can be configured to project more light to the right of the optic axis towards the first parallel projection plane 40, and it can also be configured to project more light downward, so that more light is projected below a line on the first parallel projection plane that is parallel to the optic axis. Such an optic could be useful, for example, for use on a lighting fixture mounted on a vertical wall at a high point on the wall, for example, near a ceiling.

In some examples, the light guide 1 can be configured such that one of the parallel projection planes comprises a "max-lit" portion that signifies a portion of the plane that is illuminated with more light than any other portion of the projection plane. The max-lit portion can take on a variety of shapes, configurations, or patterns. In some examples, the max-lit portion can correspond to an object on display, for example, so that the display object receives more illumination than other regions in the projection plane.

In some aspects, the light projected onto the second parallel projection plane 50 comprises a dark portion that includes little light, virtually no light, or no even light whatsoever from the light source 5. In some embodiments, the entire second parallel projection plane 50 can be a dark portion. In other embodiments, portions of the second parallel projection plane can include a lit portion whereas other portions include one or more dark portions.

In some examples, the optic body 10 can have round cross section as shown in FIG. 1. In other examples, however, the optic body 10 may take on a different shape. For example, the optic body can have a columnar shape with one or more of an ovoid, square, rectangular, triangle, trapezoidal, hexagonal, or rhombus shaped cross sections along the length of the optic body 10. The side wall 12 (or side walls) extend along and surround the optic axis 20 and are configured to emit very little of the light collected from the light source 5 such that the primary lighting occurs via emission from the distal end 16. In some aspects, the side wall 12 has a generally smooth surface, and may appear generally transparent or translucent. In some examples, the distal end surface 17 of the light guide is translucent or even transparent, so that the distal end surface 17 scatters and directs light in a predetermined direction or to a predetermined area. In some embodiments (e.g., as shown in FIG. 1), the distal end surface 17 is asymmetric with respect to the optic axis 20.

In some examples, the distal end surface 17 can have a texture. For example, the distal end surface 17 can be rough machined so that a portion of projected light 80 is scattered. In some embodiments, the distal end surface 17 may be coated with a reflective material. For example, the coating can have a diffuse reflectivity of at least 20%, and in some embodiments, the coating may have a diffuse reflectivity of up to 99%

In some embodiments, the light guide 1 can be adjustably installable with respect to a light source 5, such that the light guide 1 can be adjusted to project light to different regions of the parallel projection planes, or to different orientations of parallel projection planes. The light guide can be equipped with alignment members on or around the proximal end 14 of the light guide 1, which can be used to secure an orientation of the light guide with respect to the light source, such that the secured orientation is configured to direct light to a predetermined region of a projection plane, or to certain orientation of projection planes. For example, in some aspects, the proximal end 14 of the light guide 1 is adjustable with respect to the light source 5.

Figure 11A:
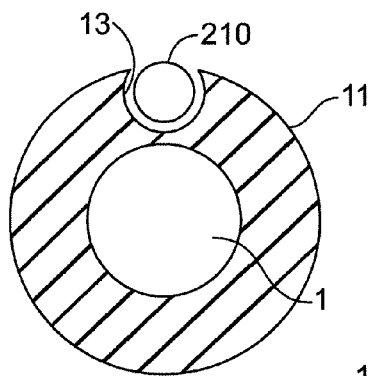
FIGS. 11A and 11B show front views of a light guide having alignment and adjustment mechanisms in accordance with at least one example of the present disclosure.

Some examples of the light guide 1 include alignment features or alignment members that facilitate control of the asymmetrical distribution of the projected light 80. For example, the light guide 1 can include a keyed structure, or slot/tab configuration that corresponds with corresponding structure on the light fixture to which the light guide 1 mounts. In this manner, the light guide 1 can be adjusted to direct light to a desired area, for example, away from a building surface. In some situations, the light could also be directed parallel to a building surface so as better illuminate, for example, a door, the ground in front of a door, or another physical feature of the building or surrounding area. FIG. 11A shows an example of a light guide 1 using a keyed structure. The base 11 of the light guide 1 has a slot 13, or groove. A key 210 or another tab, post, or protrusion can be inserted into the slot, and secured to prevent or inhibit the light guide 1 from rotating about the optic axis. In some aspects, the key 210 can be spring loaded so that the key exerts a pressure on the base 11 of the light guide 1 as the light guide 1 rotates about the optic axis. In this manner, when the slot 13 rotates to the location of the key 210, the spring loaded key 210 can protrude into the slot 13, snapping the light guide into an orientation. This can secure the light guide in a particular orientation.

Figure 11B:
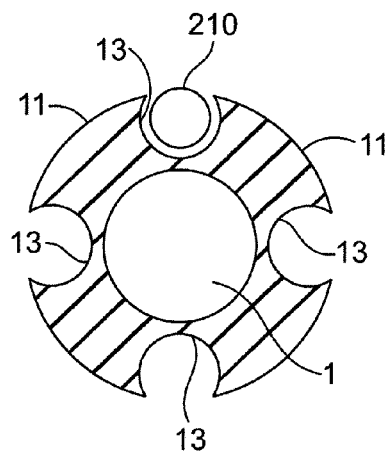

In some embodiments, the light guide 1 can include an adjustment mechanism that can be configured to adjust the orientation of the distal end 16 of the light guide 1. For example, the optic body 10 can have an adjustment member that is a joint, hinge, screw, gear, or thread that allows the distal end 16 of the light guide 1 to be adjusted and/or oriented with respect to the proximal end 14. In some embodiments, the adjustment mechanism can allow the light guide 1 to rotate between a plurality of secured orientations. FIG. 11B shows an example of a light guide 1 with an adjustment mechanism. The adjustment mechanism of FIG. 11B is similar to the alignment member of FIG. 11A, though it includes four slots 13 or divots positioned around the circumference of the base 11 of the light guide 1. In this manner, the light guide 1 can rotate about the optic axis, and the key 210 can secure the orientation of the light guide 1, for example, when a slot 13 of the light guide rotates over the key 210. In another example, the adjustment mechanism of could be a ratcheted base that allows the light guide 1 to be turned and ratcheted into a desired position and/or orientation.

FIG. 2 shows another configuration of a light guide 1. In FIG. 2, the light guide 1 comprises an offset conical-shaped distal end surface 17. The conical surface can be, for example, a cone shape that is generally symmetric about a conical axis 22. The conical axis 22 can extend at an angle α with respect to the optic axis 20. The offset axis allows the light 80 distributed by the light guide 1 to project asymmetrically. For example, as shown in FIG. 2, the light guide 1 projects light 80 such that more light is projected to the first parallel projection plane 40 than the second parallel projection plane 50.

FIG. 3 shows a light guide 1 projecting light with respect to a perpendicular projection plane 60. As shown, the perpendicular projection plane 60 intersects with the optic axis 20 at a central lighting point 62. The distal end surface 17 of the light guide 1 has an asymmetric shape so as to produce a lighting pattern on the perpendicular projection plane 60 that is asymmetric with respect to at least one line on the perpendicular projection plane 60 passing through the central lighting point 62. In some embodiments, the light pattern 80 can be asymmetric with respect to all lines on the perpendicular projection plane 60 passing through the central lighting point 62. The perpendicular projection plane 60 is perpendicular to the optic axis 60, and depending on the orientation, can be located far or near to the light guide 1. In some embodiments, the perpendicular projection plane 60 can intersect the optic axis 20 at a point on the light guide 1 itself. For example, in some embodiments, the present disclosure may refer to a lighting pattern on a perpendicular projection plane 60 that intersects the optic axis 20 at the distal end 16 of the light guide 1. That is, the perpendicular projection plane 60 can include the distal end of the light guide.

Some examples of the presently described light guide 1 are configured to distribute light from an LED light source asymmetrically, so that more light is distributed to a lit portion 82 than to a dark portion 84 of the perpendicular projection plane 60. In some examples, the light guide can be configured to project at least about 90% of the light emitted from the light source 5 to the lit portion 82 of the perpendicular projection plane 60. In some aspects, the light guide 1 is configured to direct very little light, essentially no light, or even no light whatsoever to the dark portion 84 of the perpendicular projection plane 60. In some embodiments, the distal end surface 17 of the light guide 1 is configured such that the light 80 projects roughly with an equal intensity along a lit portion 82 of a perpendicular projection plane 60.

Figure 12:
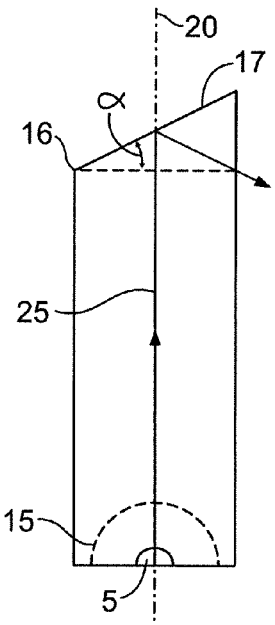
FIG. 12 shows a light guide with a distal end surface configured to project a portion of light in a backward direction.

In some embodiments, the lit portion 82 can be defined by an angle θ about the central projection point 62 on the perpendicular projection plane 62. In this manner, the light guide 1 leaves a dark portion 84 of the perpendicular projection plane 60 that comprises a range of 360° minus θ. In some embodiments, the lit portion 82 can span a range of about 200° to about 300° of the perpendicular plane 60. That is, in a perpendicular plane 60 (e.g., a perpendicular plane that intersects the distal tip of the light guide), the light guide 1 can project light with roughly equal intensity to a lit portion that extends from about 200° to about 300° of the perpendicular plane. In this manner, the dark portion will encompass about 60° to about 160° of the perpendicular plane 60. Because the lit portion spans greater than 180°, the light guide therefore projects light in a backward direction. This can be accomplished by providing a distal end surface 17 that is configured to distribute light in this pattern. Because the light guide 1 can be configured to project a portion of some light in a backward direction, the light guide 1 can provide some illumination on the mounting surface of the lighting fixture. FIG. 12 shows an example light guide 1 configuration that is capable of projecting light in this manner. The light guide 1 is generally columnar in shape and positioned so that the proximal surface 15 is positioned over a light source 5, which directs light about the optic axis 20 in a direction 25. The distal end surface 17 of the light guide 1 can have a portion that is sloped or angled at an angle α, which can be, for example, 10° or less. The distal end 16 can include a metallized or roughed surface, which can help to reflect a portion of the light down and to the side.

Figure 4:
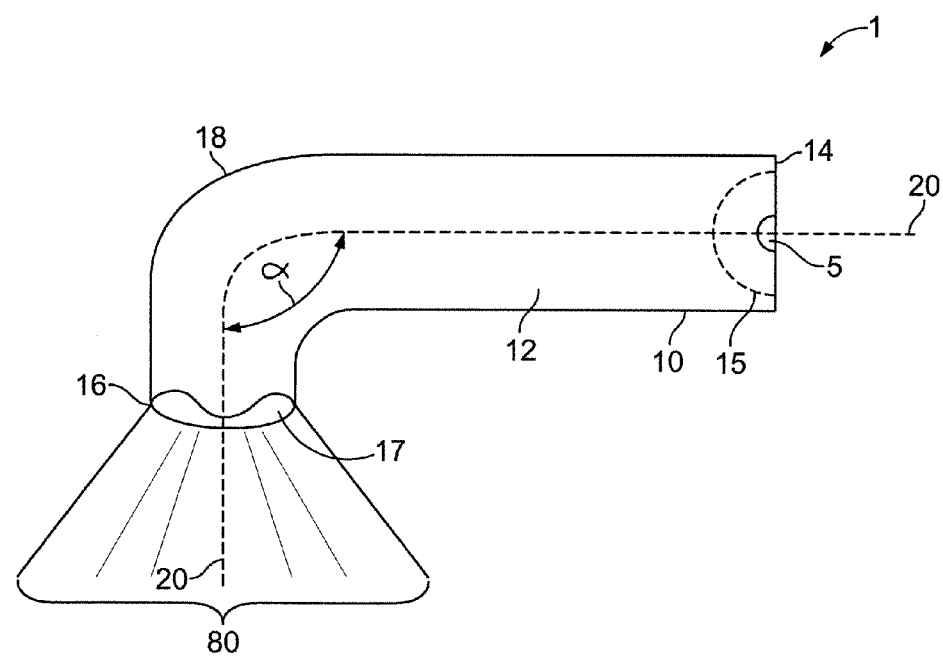
FIG. 4 shows a light guide with an elbow projecting light in accordance with at least one example of the present disclosure.

FIG. 4 depicts another embodiment of a light guide 1. The light guide 1 of FIG. 4 comprises an elbow 18. As shown, the elbow 18 establishes a bend in the light guide 1 such that a portion of the optic axis 20 passing through the distal end 16 is at an angle α with respect to the portion of the optic axis 20 passing through the proximal end 15. In some examples, the elbow 18 can establish an angle α that is between about 90° and about 180°. In FIG. 4, the elbow 18 bends the light guide 1 at an angle α of about 90°. In this manner, the optic body 10 of the light guide 1 of FIG. 1 takes on an L-shape, and the light guide 1 can project light at a 90° angle from the portion of the optic axis 20 that passes through the light source 5. The optic axis 20, as referenced throughout this disclosure, generally follows the center line of the optic body 10, and thus also includes a 90° bend as shown in FIG. 4. In this manner, the optic axis 20 extends away from the distal end 16 of the light guide 1 at an angle with respect to the portion of the optic axis 20 passing through the proximal end 14 of the light guide 1. In some aspects, the light guide 1 of FIG. 4 can rotate about the proximal end, such that the distal end 16 of the light guide projects light in different directions and to different areas with respect to the light source 5.

Figure 5:
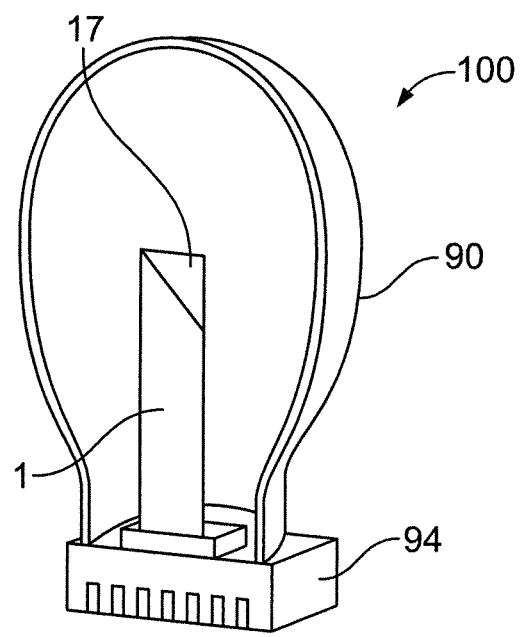
FIG. 5 shows a light bulb assembly in accordance with at least one example of the present disclosure.

The present disclosure also describes light bulb assemblies. For example, FIG. 5 shows a cross section of a light bulb assembly 100 comprising a light guide 1, and a globe 90 surrounding the light guide 1. In some embodiments, the light bulb assembly 100 includes a heat sink 94 attached or attachable to the globe 90. The heat sink can include a light source such as an LED. The light bulb assembly 100 can be configured so that the light guide 1 is positioned over the LED when the light bulb assembly 100 is mounted to a light source.

The globe 90 can be made of a glass or polymeric material. The globe 90 can be transparent, translucent, tinted, or colored. In some embodiments the globe 90 may approximate the shape of a standard incandescent bulb such as an A19 bulb or a G25 bulb, for example, or any other shape.

Figure 13:
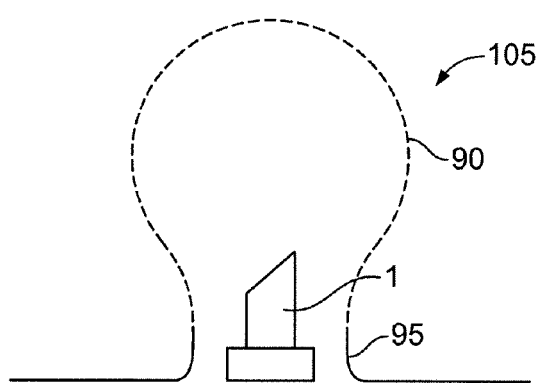
FIG. 13 shows a light fixture configured to allow a friction fit mounting of a globe in accordance with at least one example of the present disclosure.

In some embodiments the globe 90 and/or the light bulb assembly 100 are mountable about a light source in a manner that allows it to be removed or replaced by a user. In some aspects, the globe 90 itself is removably attachable to the light bulb assembly 100. For example, the light bulb assembly 100 can be configured to operate with multiple globes 90 of a different color, texture, or light filtering pattern, so that a user can interchange globes 90 to provide different looks. In some aspects, the light guide 1 is also interchangeable and/or replaceable with respect to the light bulb assembly. This is shown, by way of example, in FIG. 13, which shows a light fixture 105 with a light guide 1 installed over a light source. The light fixture 105 is equipped with a rim 95 that is configured to have a globe 90 inserted therein. The globe 90 can form a friction fit with the rim 95. In this manner, the user can employ different globes 90 when different lighting conditions are desired. For example, a user may remove a fiction fit globe 90 from the rim 95, to expose or adjust the light guide 1. The light guide 1 can also be removed from an inset, or off a post, nub, protrusion, or the like. A new light guide 1 can then be installed over the light source, and the globe 90 (or a new, different globe) can be installed over the light guide 1 via the rim 105. In some aspects, the globe 90 and the light guide 1 can be interconnected such that when the globe 90 is installed/uninstalled from a light source, the light guide 1 is also installed/uninstalled.

Figure 14:
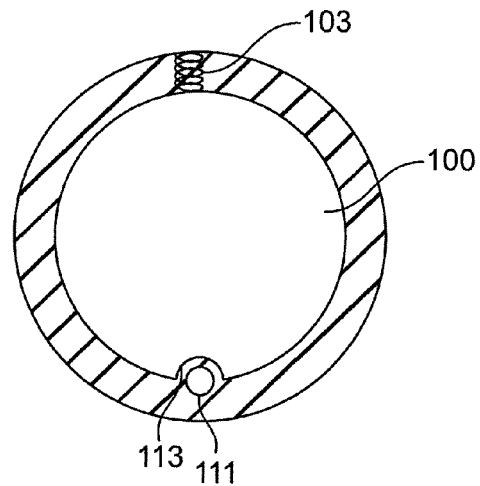
FIG. 14 is a front view of a base portion of a light bulb equipped with an alignment member in accordance with at least one example of the present disclosure.
Figure 20A:
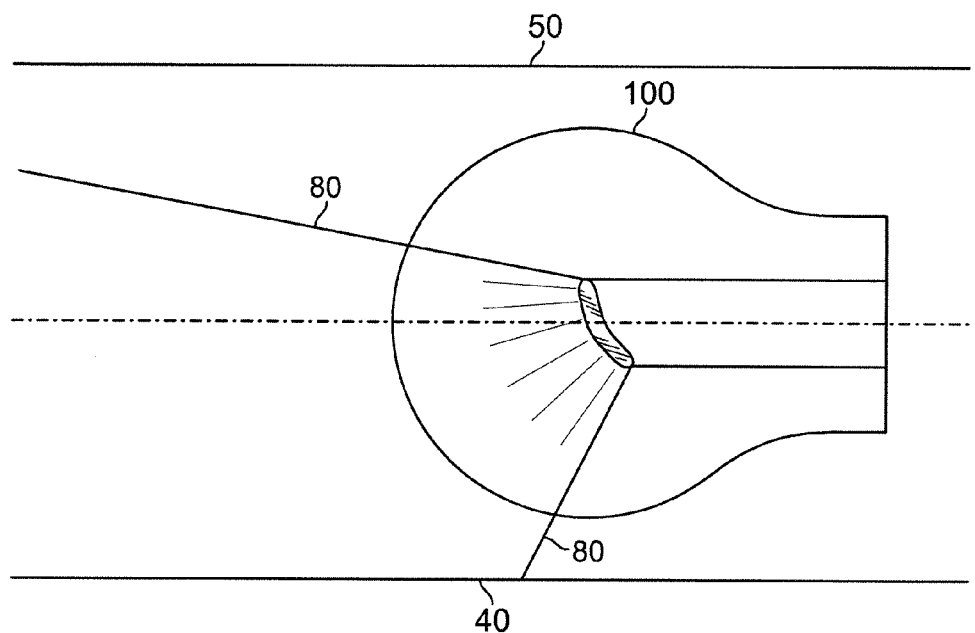
FIG. 20A shows a light bulb assembly oriented to direct light toward a parallel projection plane in accordance with at least one example of the present disclosure.
Figure 20B:
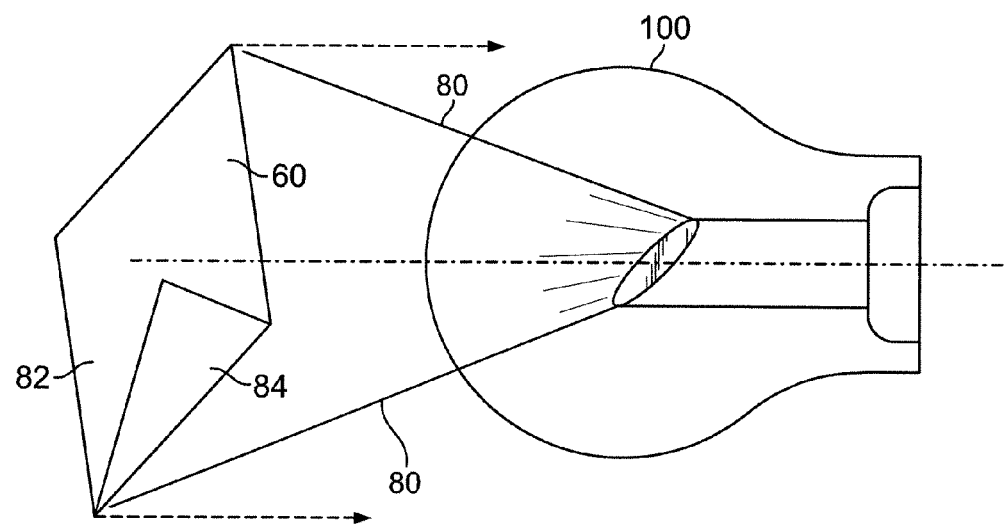
FIG. 20B shows a light bulb oriented to direct light to a lit portion of a perpendicular projection plane.

In some examples, the light bulb assembly 100 can be configured to be installed in a fixed orientation, such that the light bulb assembly installed in the fixed orientation distributes light in a particular asymmetric pattern relative to the environment around the assembly 100. For example, the light bulb assembly 100 can include an alignment member (e.g., a slot/tab configuration, a keyed configuration, a snap-fit mechanism) that facilitates installing the light bulb assembly in the fixed orientation. In the fixed orientation, the light bulb assembly 100 can direct light to a predetermined area or in a predetermined manner. For example, the light bulb assembly 100 can be locked into place in the fixed orientation, where the fixed orientation is configured to direct more light to a first parallel projection plane 40 than a second parallel projection plane 50, as demonstrated in FIG. 20A. Additionally and/or alternatively, the fixed orientation can be configured so that the light bulb assembly 100 directs more light to a lit portion 82 of a perpendicular projection plane 60 than to a dark portion 84 of the perpendicular projection plane 60, as demonstrated in FIG. 20B. FIG. 14 shows an example of a light bulb assembly 100 equipped with an alignment member. FIG. 14 is a front view of a base portion of a light bulb assembly 100, and uses a divot 113, a pin 111, and a spring 103 to secure the position and/or orientation of the light bulb assembly 100. As shown, the divot 113 is configured to align with the pin 111, and with pressure applied by a spring 103, the alignment member keeps the light bulb assembly from rotation out of the secured orientation/position.

In some aspects, the light bulb assembly 100 can installed in an adjustable configuration. For example, in an adjustable configuration, the light bulb assembly 100 can be moved, rotated, bent, angled, twisted, elongated, or otherwise adjusted to modify the area to which the light bulb assembly 100 distributes light. For example, in some examples, the light bulb assembly can be adjusted to a first configuration where more light is distributed to a first parallel projection plane 40, and then be re-adjusted to project more light to a second parallel projection plane.

Some examples of the present technology include a light fixture, which can include, for example, the light bulb assembly 100 (including the globe 90 and the light guide 1), the heat sink 94, and a light source, such as an LED or another Lambertian light source. In another embodiment, the globe 90 and the light guide 1 could be permanent objects (i.e., re-usable with multiple light sources), while the light source itself (e.g., an LED package or component) is replaceable. In this manner, users could replace a faulty LED package, employ different colored LED's (e.g., red, green, yellow, blue, etc.) or use LED's with other features such as color temperature. In some embodiments, the light guide 1 can be manufactured directly into the light fixture. In this manner, the light guide can be provided in a way to direct light to a direct location with respect to the fixture. Such an embodiment can be employed, for example, in an LED light fixture, where the LED light source is expected to last for several years without replacing. Thus, the light fixture can be designed to project light from one particular location (e.g., from a location about a doorway) to another particular location (e.g., to the ground in front of the doorway).

Figure 6A:
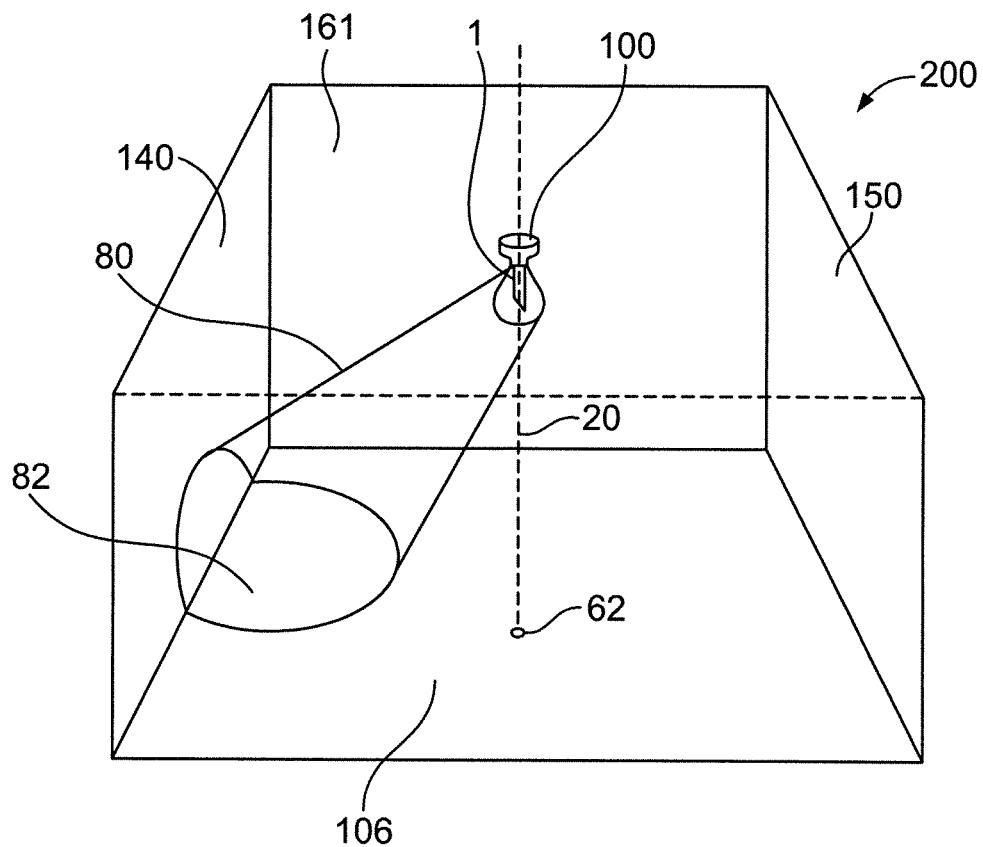
FIG. 6A shows a room having two parallel side walls and a floor lit with a light bulb assembly in accordance with at least one example of the present disclosure.

FIG. 6A shows an example of a room 200 with a light bulb assembly 100 that is configured for distributing light from an LED light source. The light bulb assembly 100 projects light from an LED light source mounted within the ceiling. The light bulb assembly 100 has a light guide 1 that extends along the optic axis 20. The optic axis 20 extends down into the room 200 and intersects the floor 160 at central lighting point 62. Two side walls 140 and 150 define the side boundaries of the room. The walls and floor of the room 200 are shown to help visualize the parallel projection planes and the perpendicular projection plane as those terms are used throughout this disclosure. For example, the floor 160 and ceiling 161 can represent a perpendicular projection plane 60, as they intersect the optic axis 20 at a 90° angle. The side walls 140 and 150 can represent the first and second parallel projection planes 40 and 50, as they run parallel to, and on opposing sides of the optic axis 20. As shown in FIG. 6, the light bulb assembly is configured to project light 80 in an asymmetric pattern. In this Figure, the light bulb assembly 100 projects light to the left of center of the room 200, establishing a lit portion 82 about the corner of the floor 160 and the first side wall 140, and away from the ceiling 161 and the second side wall 150.

Figure 6B:
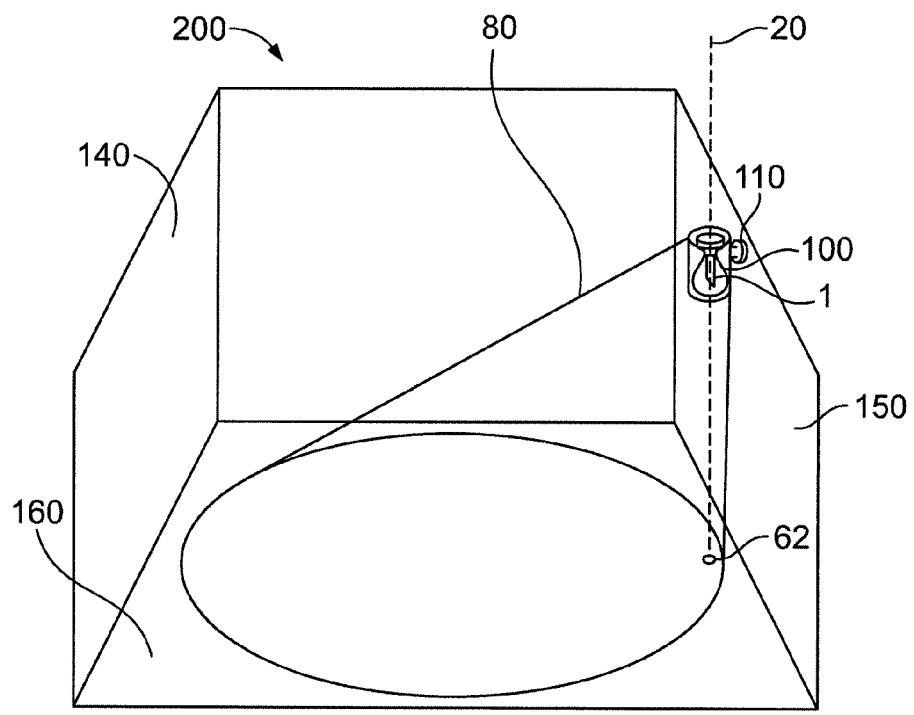
FIG. 6B shows another room having a lighting fixture mounted on a vertical wall in accordance with at least one example of the present disclosure.

FIG. 6B shows another room 200 having a lighting fixture 110 mounted on a vertical wall 150. The illustrated lighting fixture 110 is equipped with has a light bulb assembly 100 with a light guide 1. As shown in FIG. 6B, with respect to the central lighting point 62, which represents the point at which the optic axis 20 intersects the floor 160, the lighting fixture 110 directs a light pattern 80 that is asymmetrical. That is, the lighting fixture 110 directs more light away from the wall 150 and towards wall 140, thereby providing better lighting throughout the room 200. Still, a small portion of light 80 is directed in a backward direction to dimly illuminate the vertical wall 150.

Figure 9:
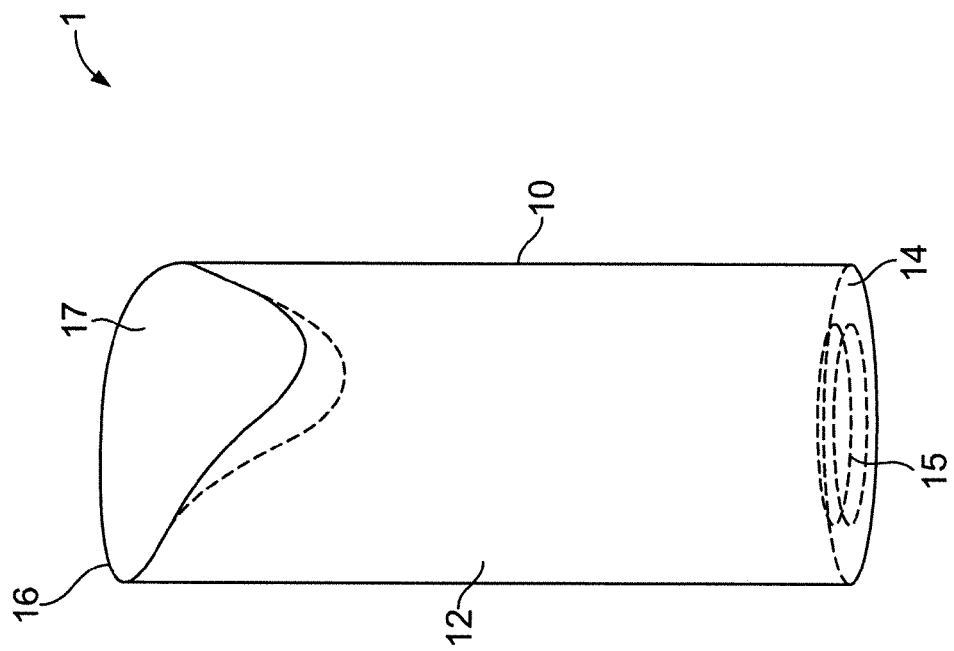
FIG. 9 shows a light guide having a distal end surface with an offset dimple feature in accordance with at least one example of the present disclosure.

The presently described light bulb assemblies 100 and light guides 1 distribute light in an asymmetric pattern. In some examples, the asymmetric pattern is achieved by the shape or configuration of the distal end surface 17 of the light guide 1. Various configurations, shapes, or patterns of the distal end surface 17 can project light in different asymmetric patterns. For instance, in some examples, the distal end surface 17 can have a shape that is asymmetric with respect any line perpendicular to the optic axis to achieve the desired light pattern. In some examples, the distal end surface 17 is curved. The curvature can be in one or two dimensions. In some aspects, the curvature can be wave-like. FIGS. 7-9 provide examples of different configurations of the distal end surfaces that can be used to project light in an asymmetric pattern.

Figure 7A:
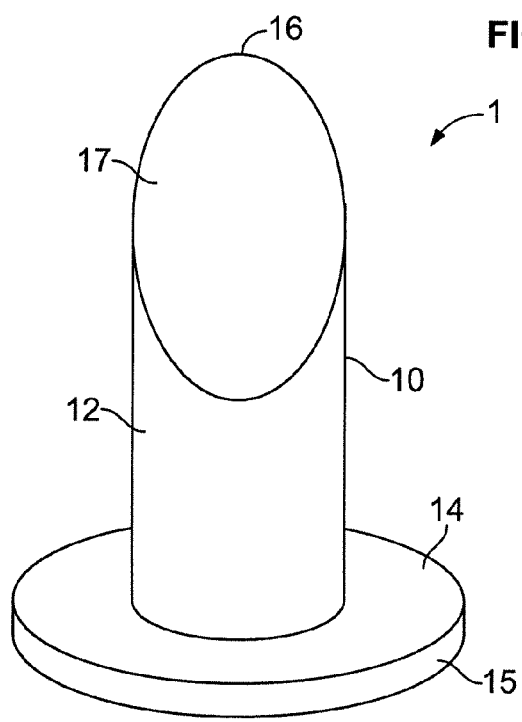
FIGS. 7A and 7B show two views of a light guide having a planar distal end surface angled with respect to the optic axis in accordance with at least one example of the present disclosure.
Figure 7B:
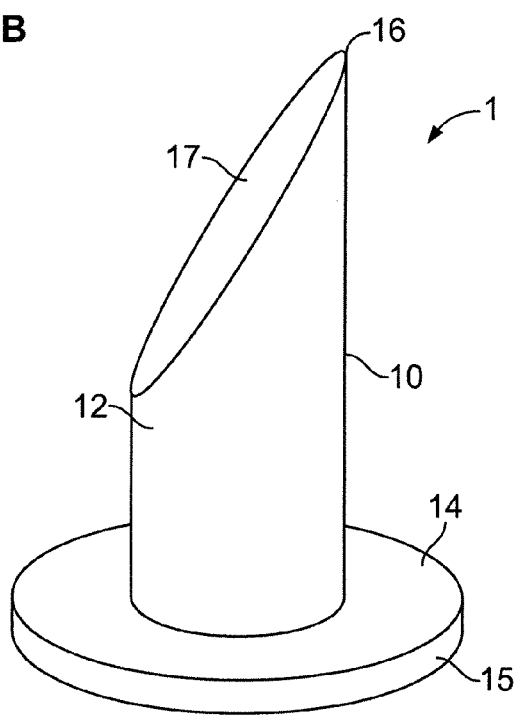
Figure 8:
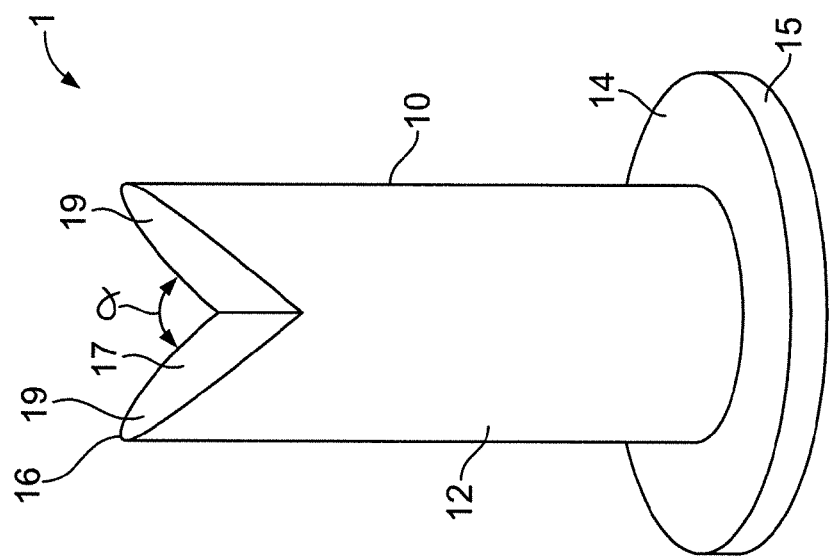
FIG. 8 shows a light guide having a V-shaped distal end surface in accordance with at least one example of the present disclosure.

FIGS. 7A and 7B show two views of a light guide 1 that has a planar distal end surface 17. The light guide 1 has a generally cylindrical shaped optic body 10, with a side wall 12 that extends circumferentially around the optic axis. The proximal end 14 has a proximal end surface 15 that is generally wider than the surface of the optic body 10. The proximal end surface 15 can be configured to mount to, on, or over a light source, or to other equipment installed with respect to a light source. In some aspects, the proximal end 14 can be configured with alignment members that assist in the installation and/or mounting of the light guide 1 about a light source.

The planar distal end surface 17 is angled with the optic axis 20. Generally, the planar distal end surface 17 is angled at an angle other than 90°. For example, the planar distal end surface 17 can be angled between 40° and 50° with respect to the optic axis 20, between 44° and 46°, or more specifically, at 45°. In this configuration, the light guide will be configured to project light in a direction that is generally perpendicular to the planar distal end surface 17. Accordingly, the light guide will project light at an angle away from the optic axis 20 (e.g., at 45°). A light intensity distribution using the light guide of FIGS. 7A and 7B is shown in FIG. 10B.

FIG. 8 shows a light guide 1 having generally cylindrical shaped optic body 10 and a V-shaped groove shape at the distal end surface 17. The V-shaped groove has two sloped surfaces 19. The sloped surfaces 19 of the V-shaped groove intersect at an angle α, which can range between 0 and 180° depending on the desired effect of the light guide 1. For example, in some embodiments, the V-shaped distal end surface 17 has an angle α of about 20° to 80°. In other embodiments, the V-shaped distal end surface 17 has an angle α of about 90°. In some aspects, the distal end surface 17 may include an inverted V-shaped surface, such that the two sloped surfaces intersect at an angle greater than 180°.

FIG. 9 shows a light guide 1 having generally cylindrical shaped optic body 10 and a distal end surface 17 with an offset dimple shape. The offset dimple shape provides a concaved indentation into the distal end surface 17. The center point of the indentation of the offset dimple can be in a location offset from the optic axis. A light intensity distribution using the light guide of FIG. 9 is shown in FIG. 10A.

While certain configurations, shapes, and patterns of light guide 1 distal end surfaces 17 have been shown and described, it should be appreciated that the present disclosure is not limited to only these configurations. It is contemplated that other patterns, shapes, or configurations could be used to project light about other asymmetrical patterns, depending on the intended use of the light.

Figure 10A:
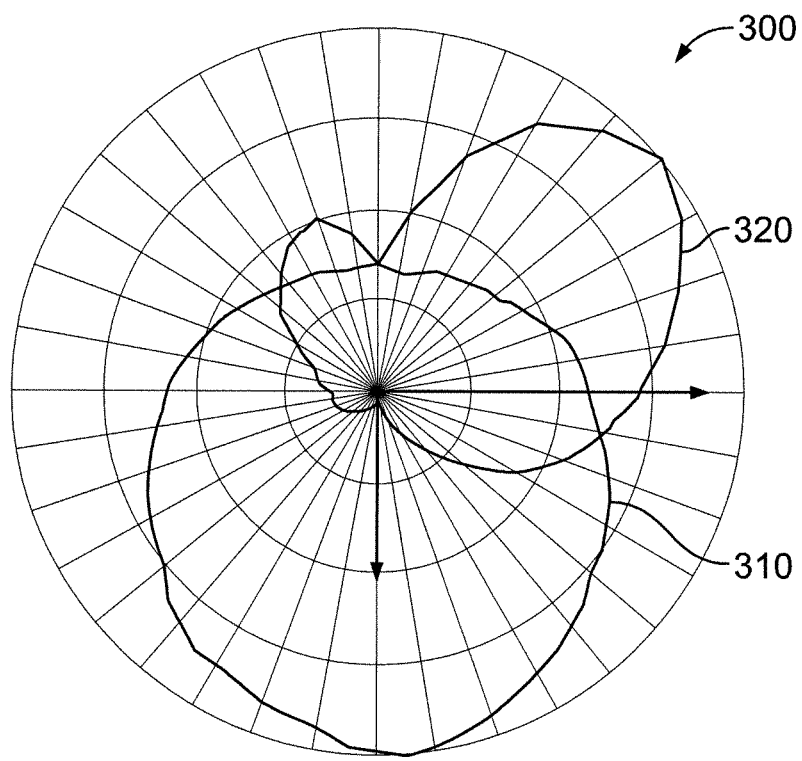
FIG. 10A shows the intensity distribution of light in a multiple planes from a light guide having a distal end surface with an offset dimple feature.
Figure 10B:
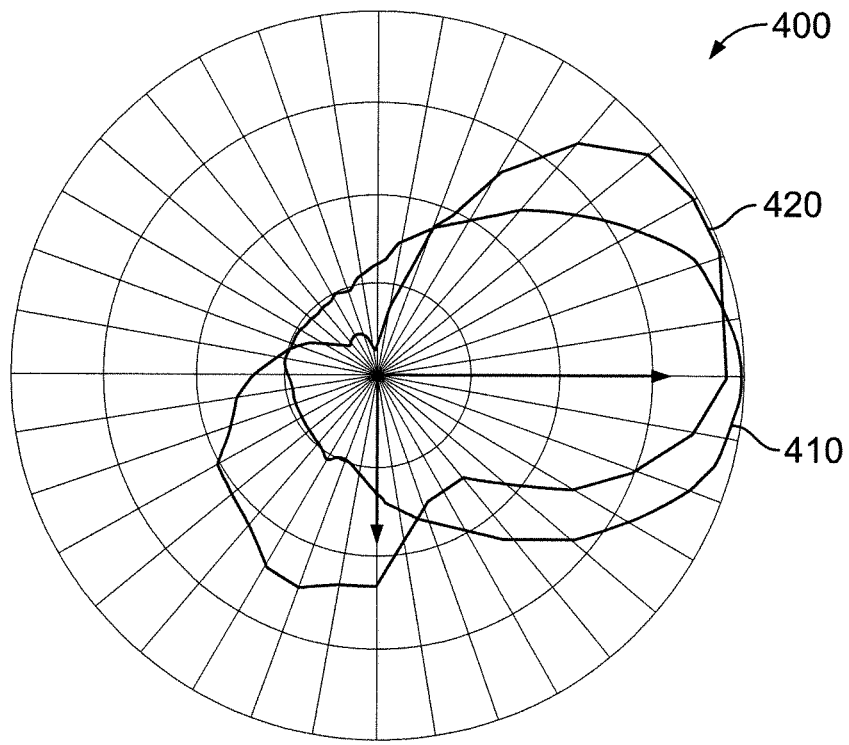
FIG. 10B shows the intensity distribution of light in a multiple planes from a light guide having a planar distal end angled at 45° from the optic axis.

FIGS. 10A and 10B are computer simulations showing the intensity distribution of light in various planes using light guides in accordance with the present disclosure. More specifically, FIG. 10A shows the simulated polar intensity distribution of light in a horizontal and vertical plane from a light guide having a distal end surface with an offset dimple feature (e.g., the light guide of FIG. 9) and a diffuse reflector coating. Line 310 represents the light intensity measured in a horizontal plane (i.e., a parallel projection plane that includes the optic axis) and line 320 represents the light intensity measured in a vertical plane (i.e., a perpendicular projection plane that includes the distal end of the light guide). The arrows represent the front of the light guide. As shown in this chart, the approximate distribution of light is about 80% in a forward direction, and about 20% in a backward direction.

FIG. 10B shows the simulated polar intensity distribution of light in a horizontal and vertical plane from a light guide having a 45° angled planar distal end surface (e.g., the light guide of FIGS. 7A and 7B), and a rough tooled surface (i.e., a translucent surface). Line 410 represents the light intensity measured in a horizontal plane (i.e., a parallel projection plane that includes the optic axis) and line 420 represents the light intensity measured in a vertical plane (i.e., a perpendicular projection plane that includes the distal end of the light guide). The arrows represent the front of the light guide. As shown in this chart, the approximate distribution of light is about 90% in a forward direction, and about 10% in a backward direction.

The present disclosure also describes methods of projecting light in an asymmetric pattern. For example, methods can involve using a light guide, a light bulb assembly, or a light fixture described herein in the manners described to project light in an asymmetric pattern about one or more projection planes. In some embodiments, the method can involve distributing light with respect to a first parallel projection plane 40 and a second parallel projection plane 50 as described herein and depicted in the related figures. Additionally and/or alternatively, the method can involve distributing light with respect to a perpendicular projection plane 60, which intersect the optic axis 20 at a 90° angle. In some embodiments, the perpendicular projection plane can include and/or pass through the light guide, the light bulb assembly, and/or the light fixture itself. In some embodiments, a method involves emitting light from a light source such as an LED or another Lambertian light source.

The method can also include distributing the light from the light source with a light guide (e.g., a light guide as described herein). For example, the method can involve distributing light with a light guide that has an optic body extending along the optic axis, and at least one side wall surrounding the optic axis. The light guide includes a proximal end having a proximal end surface configured to receive light from an emitting surface of a light emitting diode. Examples light guides also include a distal end situated away from the proximal end and a distal end surface configured to distribute light emitted by the light emitting diode. The distal end can take on various configurations as described herein and depicted in the figures. The configuration and shape of the distal end of the light guide distributes the light to predetermined lighting areas (e.g., a lit portion of a perpendicular projection plane, a first parallel projection plane, etc.) or in a particular asymmetrical lighting pattern. The method can be used to project light from a light source that is located on or near a wall and/or ceiling. In this manner the method results in projecting a majority of the light from the light source away from the adjacent walls or ceilings, while also providing a sufficient amount of light back towards the mounting surface.

The present disclosure presents light guides, light bulbs, light fixtures, and other equipment involving or operating in connection with a LED based light source. The presently disclosed lighting structures can be used, for example, in a luminaire that approximates the appearance of an incandescent lamp in both the on and off states. Some aspects of the present disclosure describe technology that includes a light guide that receives light from one or more LED devices and a translucent surface at a far end that disperses light in an asymmetric pattern. The asymmetries in the distribution pattern can be designed to reduce the intensity of light reflecting off interior surfaces of the luminaire, or other walls or structures. This feature can provide a light source having improved fixture efficiency, especially for luminaires that have a reflecting surface near the light source. The described technology can also provide a light source with an improved overall directional efficiency for light sources mounted near a wall or ceiling, as the present technology can reduce the incident light that reflects off the walls and/or or ceiling.

The present disclosure can be applied to a wide array of different light fixtures and light sources. For example, the light guides of the present disclosure can be applied in wall sconces, ceiling lights, ceiling fans, desk or table lamps, outdoor lights, security lights, and/or movable barrier operators (e.g., garage door operators). For example, the above disclosure describe light guides and light bulb assemblies that can be applied to use with a movable barrier operator.

Figure 15:
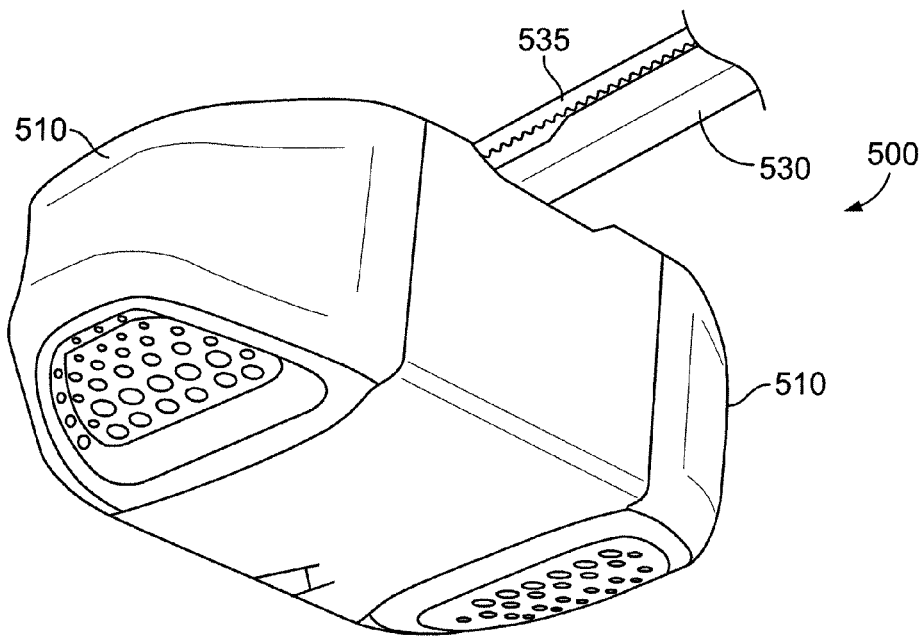
FIG. 15 is an example of a garage door operator as used in accordance with at least one example of the present disclosure.

A movable barrier operator can be installed on the ceiling of a garage and used to control the opening/closing of a garage door. The movable barrier operator can be equipped with a motorized system that opens and closes a movable barrier (e.g., a garage door) with the press of a button. The movable barrier operator can have a light that illuminates the garage, or a portion of the garage, at certain times. For example, the movable barrier operator can have a light that a user can manually turn on and off or that turns on automatically each time the movable barrier operator is activated to open or close the garage door. FIG. 15 is an example of a movable barrier operator, more specifically, a garage door operator 500 that includes a drive rail 530 that allows a chain 535 to open and close a garage door. Two light sources are shown on opposing sides of the garage door operator 500. Each light source is protected with a light cover 510, which can be removed so that the light source can be replaced, repaired, or removed. In FIG. 15, the garage door operator 500 has two light sources so that light can project in two different directions away from the garage door operator 500.

Movable barrier operators can control the direction and distribution of light to certain desired locations of a room. For example, a movable barrier operator can direct light toward and/or away from a garage door, toward and/or away from a home entryway, toward and/or away from a particular vehicle bay, or toward and/or away from a workbench or other workspace in the garage. Movable barrier operators can achieve this controlled distribution via a number of techniques. For example, a movable barrier operator can be mounted on a ceiling with the light source pointed in a particular configuration. The movable barrier operator can be equipped with a light source positioned on one or more particular sides of the base unit. Further, a movable barrier operator can be configured to be remounted in multiple different positions and orientations with respect to the garage. In certain aspects, a movable barrier operator can be equipped with a light directing element to direct light to predetermined locations. In some embodiments, the light directing element can be a light guide as described in this disclosure. That is, a garage door operator can have a light source (e.g., an LED light source) and a light directing element positioned in relation to the light source.

Figure 16:
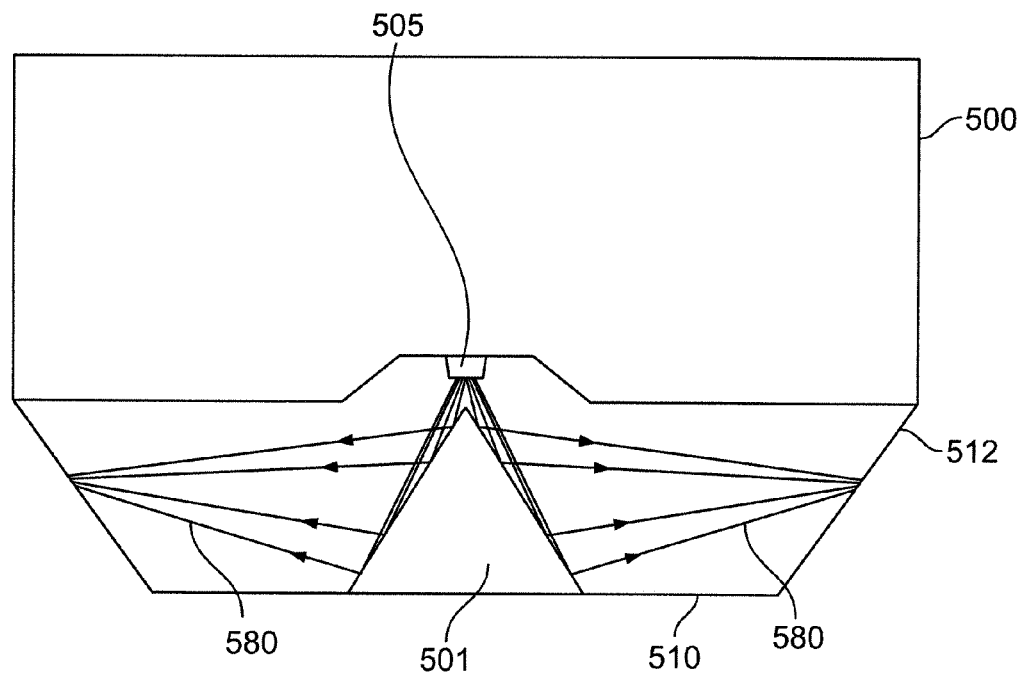
FIG. 16 shows an example of a movable barrier operator employing a light guide to project light in accordance with at least one example of the present disclosure.

FIG. 16 shows an example of a movable barrier operator 500 employing a light distributing element 501 to distribute light in a predetermined pattern in accordance with at least one example of the present disclosure. As show in FIG. 16, the garage door operator 500 is equipped with a light source 505, which can be, for example, an LED light. A light distributing element 501 can be positioned on, about, or near the light source 505 so as to reflect and/or distribute light from the light source 505 in a predetermined pattern. The light distributing element 501 can be attached to an interior surface of the light cover 510. In some aspects, the predetermined pattern can be, for example, asymmetrical.

The light distributing element 501 can be a transparent or semi-transparent object, such as glass or plastic, for example, and can be configured to reflect and/or refract all or a portion of light directed to it. In FIG. 16, the light distributing element 501 is generally triangular (i.e., conical and/or pyramidal) in shape, and is configured to reflect light 580 from the light source 505 to opposite sides 512 of the light cover 510. The light cover 510 may include a transparent or translucent defuser surface so as to defuse light emitted from the garage door operator 500. In some embodiments, the light distributing element 501 may allow a portion of the light 580 to pass through the light distributing element 501 and light cover 510 in addition to reflecting some of the light to opposite sides 512 of the light cover 510. In other embodiments, the light distributing element 501 can reflect all or virtually all of the light 580 from the light source 505 to predetermined locations. In some examples, the light distributing element 501 is a light guide as described herein or as depicted in any of FIGS. 1-14.

In some aspects, the light distributing element 501 can be a part of the light cover 510. For example, the light distributing element 501 can be embedded in or attached to a front inner surface of the light cover 510. In this manner, the light cover 510 can be configured to project light in a particular projection pattern. A user desiring a different pattern could replace the light cover 510 with another cover that has a different light distributing element 501 embedded therein or connect the light cover 510 to the movable barrier operator in a different orientation. The light cover 510 can be used to protect electronic portions of the movable barrier operator 500, and in some aspects the movable barrier operator 500 can be configured so that it will not activate or project light unless the light cover 510 is in place. In some examples, the light distributing element 501 is mountable and/or removably mountable to the light cover 510. In this manner, the light cover 510 and/or the light distributing element 501 can be configured to be mountable to the housing in a plurality of orientations to effect a plurality of arrangements between the light distributing element and the light source.

Additionally and/or alternatively, the movable barrier operator may operate with a generic light cover 510, and the light distributing element 501 itself can be replaceable or repositionable relative to the LED (for instance rotated about any axis or moved linearly toward or away in any direction). For example, the light cover 510 can have a connector configured to receive a variety of differently-shaped light distributing elements 501. In this manner, a user can replace the light distributing element 501 when the user desires the garage door operator to project light in a different light projection pattern. Alternatively, the light distribution element 501 and light cover 510 may be permanently affixed to the movable barrier operator. By employing a light distributing element 501, a movable barrier operator can utilize smaller and more efficient LED light sources while still distributing in the same manner as a typical incandescent light. Thus, the resulting movable barrier operators can be smaller, less bulky, more energy efficient, and safer (e.g., by reducing the possibility of fires caused by an incandescent bulbs contacting a light cover), while still having good light distribution properties.

The light distributing element 501 used in the movable barrier operator 500 can take on a variety of shapes and/or configurations to project light in a variety of configurations and patterns. In some embodiments, the light distributing element 501 can be a light pipe or other object with a symmetrical light refractor surface that distributes light to the edges of the light cover 510. The light distributing element 501 can have a variety of different sizes, shapes, and configurations depending on the light distribution pattern that they are intended to generate. For example, the light distributing element 501 can have a square shaped base, but in other examples, the light distributing element 501 can have a rectangular shaped base to match the shape of the light cover 510. In other embodiments, the base light distributing element 501 can be round so that the element 501 can be easily rotated or adjusted when installed. The base of the light distributing element 501 can also be any other shape, such as triangular, elliptical, or trapezoidal, depending on the intended light distribution pattern.

The light distributing element 501 can have a curvature from top to bottom and left to right as a way of controlling the light distribution. In this manner, the light distributing element 501 can compensate for an uneven distribution of light from the source. In operation, a user can rotate the light distributing element 501 to a desired orientation. The light distributing element 501 can also be used to control the light that hits the edge of the light cover 510 as compared to the amount of light that hits the bottom, or front of the light cover 510. For example, the shape of the light distributing element 501 can be adjusted, and/or the reflector surface can be adjusted up, down, or around one or more axes of the light distributing element 501.

The light distributing element 501 can distribute light using one of a reflective or a refractive technique. That is, in some embodiments, the light distributing element 501 is or includes a reflective element positioned away from the light source, and having a surface structure designed to reflect and distribute the light. In some instances, the distributing reflective element attaches to the interior portion of the light cover 510. For instance, the reflective element may be mounted to the interior portion of the front surface of the light cover 510, and arranged to reflect light projected from the light source towards at least one side surface of the light cover. In some examples, the reflective element includes two to four, or even more reflective surfaces. Some examples of the reflective element have a pyramidal shape with a top point and mounts to the light cover so that the top point faces the light source. In other examples, the reflective element has a roof top shape with a top portion, and mounts to the light cover so that the top portion faces the light source.

In some aspects, one or more of the reflective surfaces of the reflective element include a non-flat portion. For example, the non-flat portion may include one or more of a concave portion, a convex portion, bumps, waves, recesses, or fluctuations in the curvature of the surface. In this manner, the non-flat portion can be arranged to scatter light in a predetermined projection pattern.

In other embodiments, the light distributing element 501 is a light guide (e.g., one of the light guides described herein with respect to FIGS. 1-14) mountable over the light source 505 that distributes light using a refractive technique. For example, the light distributing element can assume one or more of the embodiments of light guides (e.g., light guide 1) described herein, and can be mountable, or removably mountable, relative to the light source. In some examples, the light distributing element 501 can mount to the light cover 510.

The light distributing element 501 can have a proximal end configured to receive light from the light source 505, and a distal end (or tip) having a shape and configuration designed to scatter and distribute the light. In some aspects, the light guide has a distal tip with a roof top shape. For example, the roof top shape comprises two surfaces meeting at a top portion, wherein the top portion faces away from the light source. In this manner, the light guide may be configured to scatter light toward two or more side surfaces of the light cover 510 and/or toward the front surface of the light cover 510. In other examples, the distal tip has a pyramidal shape comprising three tip surfaces. Such a shape may be able to project light toward at least two side surfaces 512 of the light cover. The pyramidal shaped distal tip could also have four (or more) tip surfaces, and be arranged to project light toward three or more surfaces. The tip surfaces of the distal tip can be arranged to meet at a top point, with the top point faces away from the light source. In some examples, the light guide 501 can be arranged to scatter, distribute, and/or direct light towards the front surface of the light cover.

Figure 17A:
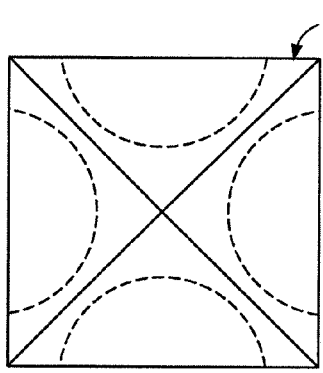
FIGS. 17A-17H show examples of light guides configured for use on a movable barrier operator in accordance with examples of the present disclosure.
Figure 17B:
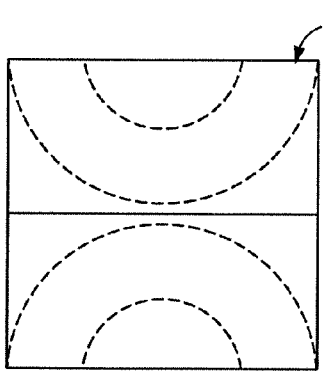
Figure 17C:
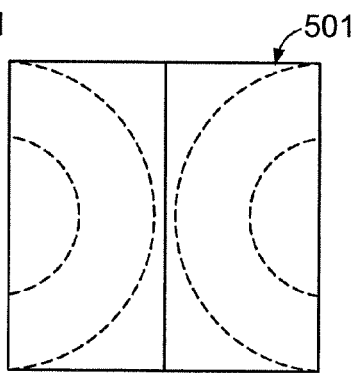

The light distributing element 501 can take on a variety of different shapes, sizes and configurations to achieve different light distribution patterns. FIGS. 17A-17C show top views of a light distributing element 501 in various configurations for use on a movable barrier operator 500. In FIG. 17A, the light distributing element 501 is a reflective element. The light distributing element 501 has a 4-sided pyramidal configuration, where each of the four sides has a curved, or partially curved (i.e., not flat) surface as shown with broken lines. In some aspects, all four sides of the pyramidal configuration can be curved, but in other embodiments, one or more surfaces can be generally flat.

FIGS. 17B and 17C show configurations of another reflective light distributing element 501 with a "roof top" shape. As shown in FIGS. 17B and 17C, the sides of the light distributing element 501 can have one or more convex or concave portions, (shown in broken lines), which can be, for example, bumps, waves, recesses, or fluctuations in the curvature of the surface to scatter the light in a projection pattern. In this manner, the position or orientation of the light distributing element 501 can be adjusted to distribute the light to desired locations.

FIGS. 17D-17H show examples of a refractive light distributing element 501. Specifically, FIGS. 17D-17H show examples of a refractive light distributing element 501 that is a light guide. More specifically, FIGS. 17D-17H show front views of the distal tip of a light distributing element 501 used in accordance with a movable barrier operator.

Figure 17D:
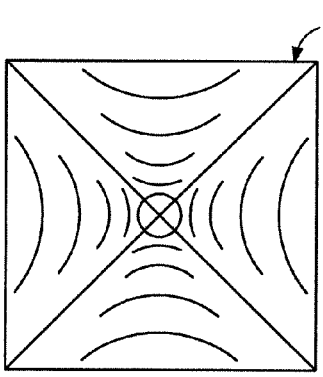
Figure 17E:
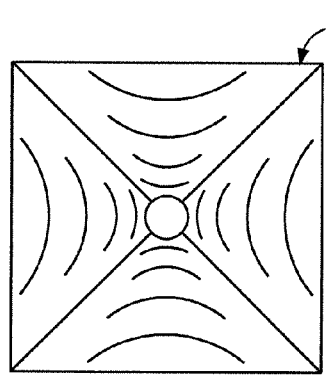

FIGS. 17D and 17E show the distal surface of a light distributing element 501 that has been symmetrically cut so that four sides converge to a point. The distal tip of the light distributing element of FIGS. 17D and 17E thus distributes light in directions perpendicular to the cut surfaces of the distal tip. In some embodiments, the light distributing element 501 can have a square or rectangular shaped cross section, and in other embodiments, the light distributing element 501 can have a round cross section. The light distributing element 501 can also include an optic body, or light pipe, that extends beyond the distal tip. The optic body can vary in length, and can be significantly shorter or longer than the length of the distal tip, or anywhere in between. In FIG. 17D, the light distributing element 501 is generally symmetrical and is configured to distribute light to the edges of the light cover 510. FIG. 17E further comprises a center refracting surface, which is configured to allow a portion of light to shine straight through the light distributing element 501, to the front surface of the light cover 510. In some embodiments, the tip of the light distributing element 501 can have concave and/or convex portions, which can be bumps, waves, recesses, or fluctuations in the curvature of the surface to scatter the light in a projection pattern.

Figure 17F:
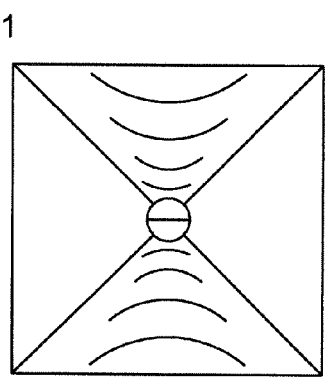
Figure 17G:
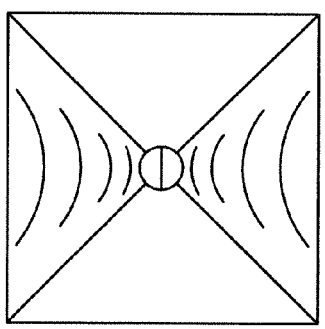
Figure 17H:
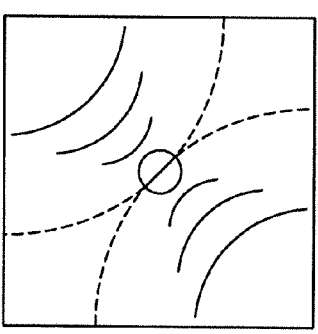

FIGS. 17F, 17G, and 17H show distribution patterns of a light distributing element 501 configured to distribute light in different directions. In FIG. 17F, the distal tip of the light distributing element 501 has been cut to form two surfaces that converge at a line that runs horizontal to the figure. The light distribution element 501 refracts and distributes the light in a direction perpendicular to the surfaces, thereby distributing the light up and down. FIG. 17G shows the light distributing element 501 of FIG. 17F rotated 90 degrees, thereby distributing light left and right. FIG. 17H shows the light distributing element 501 rotated between the positions of FIGS. 17F and 17G, thereby distributing light to the upper left and lower right of the figure.

The light distributing elements 501 depicted in FIGS. 17A-17H can be employed to distribute light from an LED light source in a variety of different distribution patterns. FIGS. 18A-18H show an embodiment of a light distributing element 501 in operation so as to show the light distribution pattern.

FIGS. 18A-18C provide various views one example of a light distribution element for use in connection with a movable barrier operator. In FIGS. 18A-18C, the light distribution element is essentially a round rod, where the tip of the rod has been cut to form a two-sided "roof top" shape.

The tip of the light distribution element is generally sliced from the center outwards at an angle, forming refraction surfaces configured to distribute light away from the surfaces.

Figure 18D:
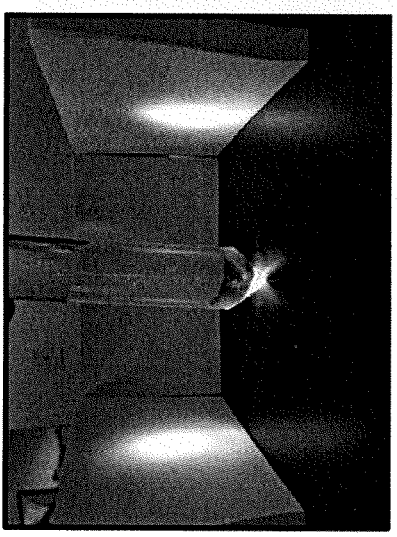
FIGS. 18D-18H show the light distribution patterns generated by the light distribution element of FIGS. 18A-18C.
Figure 18E:
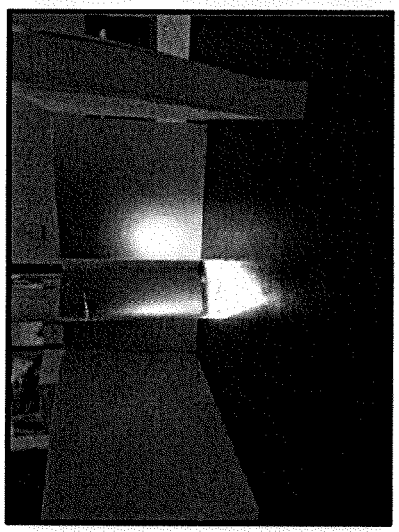
Figure 18F:
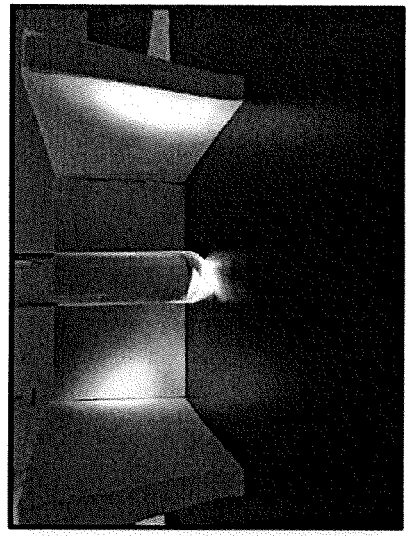
Figure 18G:
Figure 18H:
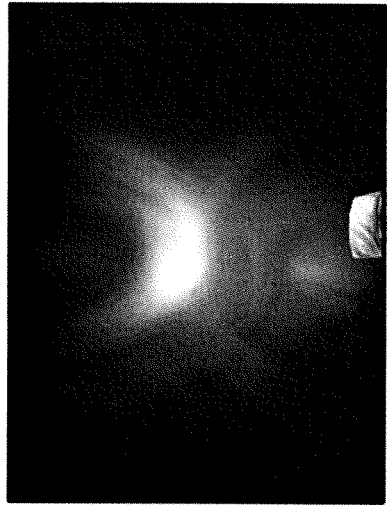

FIGS. 18D-18H show the light distribution patterns generated by the light distribution element of FIGS. 18A-18C. As shown, the light distribution element distributes light to the sides of the element, generally perpendicular to the two surfaces of the tip of the light distributing element. FIGS. 18G and 18H show how light is distributed to a surface that is perpendicular to the optic axis of the light distributing element.

Figure 19A:
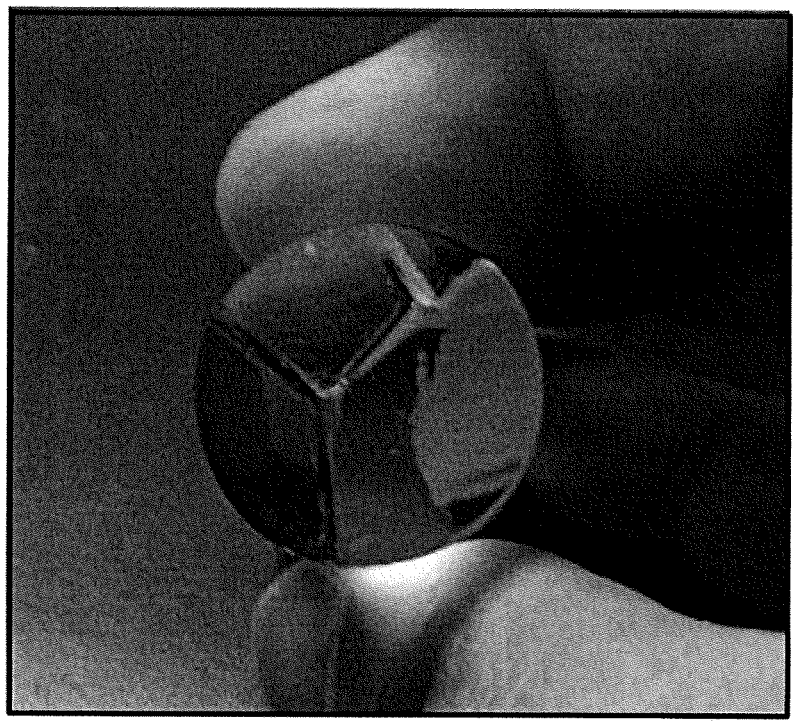
FIG. 19A is a light distribution element having a three-sided shape in accordance with at least one example of the present disclosure.
Figure 19B:
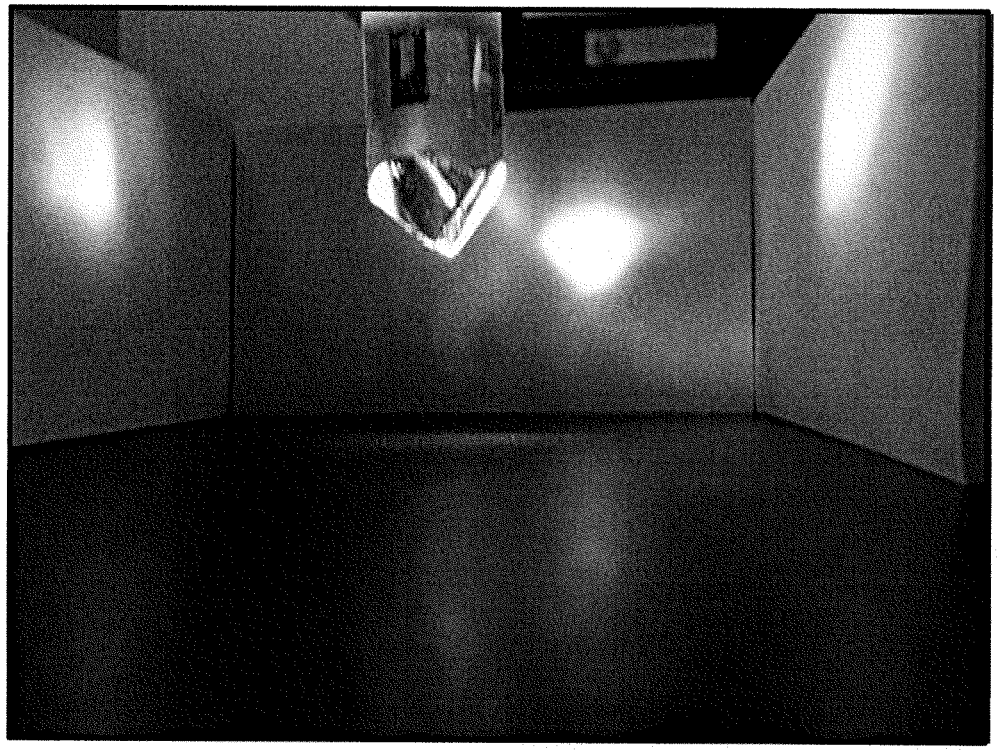
FIG. 19B shows the light distribution patterns generated by the light distribution element of FIG. 19A.

FIG. 19A is another example of a light distribution element for use in connection with a movable barrier operator. In FIG. 19A, the light distribution element is essentially a round rod, where the tip of the rod has been cut to form three sides converging at a center point. FIG. 19B shows the light distribution pattern generated by the light distributing element of FIG. 19A. As shown, the light distribution pattern scatters light generally to three regions extending away from the light distribution element, separated by about 120°.

The present disclosure describes preferred embodiments and examples of the present technology. Reference throughout this specification to "one embodiment," "an embodiment," or similar language means that a particular feature, structure, or characteristic described in connection with the embodiment is included in at least one embodiment of the present invention. The embodiments shown in the drawings, if any, and as described above are merely for illustrative purposes and not intended to limit the scope of the invention. Moreover, those skilled in the art will recognize that a wide variety of modifications, alterations, and combinations can be made with respect to the above described embodiments without departing from the scope of the invention as set forth in the claims, and that such modifications, alterations, and combinations are to be viewed as being within the ambit of the inventive concept. Thus, appearances of the phrases "in one embodiment," "in an embodiment," and similar language throughout this specification may, but do not necessarily, refer to the same embodiment. All references cited in the present disclosure are hereby incorporated by reference in their entirety.

What is claimed is:

1. A movable barrier operator mountable to a ceiling or a wall, the movable barrier operator comprising:
   an operator housing comprising a motor configured to open and close a movable barrier;
   a light source mounted to the housing, the light source comprising a light emitting diode;
   a light cover attachable to the housing, the light cover configured to cover the light source, the light cover having an interior portion and an exterior portion, a front surface opposite the housing, and side surfaces extending between the front surface and the housing; and
   a light distributing element having a proximal end portion mountable to the light cover or the housing with respect to the light source, the light distributing element further having a distal end portion opposite the proximal end portion, the distal end portion including a distal most tip and at least one surface extending proximally from the distal most tip,
   wherein the light distributing element is configured to scatter light projected by the light source, wherein at least a portion of the scattered light is directed toward at least one of the four side surfaces of the light cover.

2. The movable barrier operator of claim 1, wherein the light distributing element comprises a reflective element.

3. The movable barrier operator of claim 2, wherein the reflective element is attachable to the interior portion of the light cover.

4. The movable barrier operator of claim 3, wherein the reflective element is mounted to the interior portion of the front surface of the light cover, and wherein the reflective element is configured to reflect light projected from the light source towards at least one side surface of the light cover.

5. The movable barrier operator of claim 3, wherein the reflective element comprises two to four reflective surfaces.

6. The movable barrier operator of claim 5, wherein the reflective element has a pyramidal shape having a top point at the distal most tip, and wherein the reflective element is mounted to the light cover so that the top point faces the light source.

7. The movable barrier operator of claim 5, wherein the reflective element has a roof top shape having a top portion at the distal most tip, and wherein the reflective element is mounted to the light cover so that the top portion faces the light source.

8. The movable barrier operator of claim 5, wherein at least one of the reflective surfaces comprises a non-flat portion.

9. The movable barrier operator of claim 8, wherein the non-flat portion comprises at least one of a concave portion, a convex portion, bumps, waves, recesses, or fluctuations in the curvature of the surface.

10. The movable barrier operator of claim 9, wherein the non-flat portion is configured to scatter light in a predetermined projection pattern.

11. The movable barrier operator of claim 1, wherein the light distributing element comprises a light guide.

12. The movable barrier operator of claim 11, wherein the light guide is mountable over the light source.

13. The movable barrier operator of claim 11, wherein the light guide is attachable to the interior portion of the light cover.

14. The movable barrier operator of claim 11, wherein the light guide extends along an optic axis, and wherein the light guide is configured to project light with respect to a first parallel projection plane and a second parallel projection plane, the first and second parallel projection planes being parallel to and located on opposite sides of the optic axis.

15. The movable barrier operator of claim 14, wherein the light guide further comprises:
   an optic body extending along the optic axis, the optic body having at least one side wall surrounding the optic axis;
   the proximal end portion having a proximal end surface configured to receive light from an emitting surface of the light source; and
   the distal most tip is configured to distribute light emitted by the light emitting diode,
   wherein the light guide distributes light asymmetrically such that more light projects onto the first parallel projection plane as compared to the second parallel projection plane in at least one orientation of the first and second parallel projection planes around the optic axis.

16. The movable barrier operator of claim 15 wherein the distal most tip has a roof top shape.

17. The movable barrier operator of claim 16, wherein the roof top shape comprises two surfaces meeting at a top portion, wherein the top portion faces away from the light source.

18. The movable barrier operator of claim 17, wherein the light guide is configured to scatter light toward at least two side surfaces of the light cover.

19. The movable barrier operator of claim 17, wherein the light guide is configured to scatter light toward the front surface of the light cover.

20. The movable barrier operator of claim 15, wherein the distal most tip has a pyramidal shape comprising and the at least one surface includes at least three tip surfaces.

21. The movable barrier operator of claim 20, wherein the tip surfaces of the distal most tip meet at a top point, and wherein the top point faces away from the light source.

22. The movable barrier operator of claim 20, wherein the light guide is configured to scatter light towards at least two side surfaces of the light cover.

23. The movable barrier operator of claim 20, wherein the at least three tip surfaces includes at least four tip surfaces.

24. The movable barrier operator of claim 23, wherein the light guide is configured to scatter light towards three or more side surfaces of the light cover.

25. The movable barrier operator of claim 15, wherein the light guide is configured to scatter light towards the front surface of the light cover.

26. The movable barrier operator of claim 1, wherein the light distributing element is mounted to be movable relative to the light source.

27. The movable barrier operator of claim 1, wherein the light distributing element is mounted to the light cover and the light cover is configured to be mountable to the housing in a plurality of orientations to effect a plurality of arrangements between the light distributing element and the light source.

* * * * *